United States Patent
Zhang et al.

(10) Patent No.: US 11,756,417 B2
(45) Date of Patent: Sep. 12, 2023

(54) METHOD, APPARATUS, AND SYSTEM FOR DETECTING ROAD INCIDENTS

(71) Applicant: HERE Global B.V., Eindhoven (NL)

(72) Inventors: Zhenhua Zhang, Chicago, IL (US); Bruce Bernhardt, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 325 days.

(21) Appl. No.: 17/095,521

(22) Filed: Nov. 11, 2020

(65) Prior Publication Data
US 2022/0084398 A1    Mar. 17, 2022

Related U.S. Application Data

(60) Provisional application No. 63/079,262, filed on Sep. 16, 2020.

(51) Int. Cl.
*G08G 1/01* (2006.01)
*G08G 1/0967* (2006.01)

(52) U.S. Cl.
CPC ......... *G08G 1/0133* (2013.01); *G08G 1/0112* (2013.01); *G08G 1/096791* (2013.01)

(58) Field of Classification Search
CPC ............... G08G 1/0133; G08G 1/0112; G08G 1/096791
See application file for complete search history.

(56) References Cited

U.S. PATENT DOCUMENTS

| | | | |
|---|---|---|---|
| 9,470,534 B2 | 10/2016 | Kesting et al. | |
| 9,664,523 B2 * | 5/2017 | Matsunaga | G01C 21/3889 |
| 9,818,295 B2 | 11/2017 | Kesting et al. | |
| 10,629,069 B2 * | 4/2020 | Smothers | G08G 1/096844 |
| 10,657,807 B1 * | 5/2020 | Sheynman | G08G 1/0112 |
| 11,009,366 B2 * | 5/2021 | Xu | G08G 1/096708 |

(Continued)

FOREIGN PATENT DOCUMENTS

| | | | |
|---|---|---|---|
| CN | 109598930 A | 4/2019 | |
| JP | 5931989 B2 * | 6/2016 | 701/117 |

OTHER PUBLICATIONS

"Autodrive | Automatic Gps Based Vehicle Driving System", retrieved on Sep. 16, 2020 from https://www.eventhelix.com/ThoughtProjects/AutoDrive/auto_drive_concept.htm, 4 pages.

(Continued)

*Primary Examiner* — Luis A Martinez Borrero
(74) *Attorney, Agent, or Firm* — DITTHAVONG, STEINER & MLOTKOWSKI

(57) ABSTRACT

An approach is provided for detecting and/or verifying a traffic incident (e.g., a road closure) on one of nearby paths that are susceptible to location sensor errors, digital map errors, and/or map mis-matching errors. The approach involves, for example, determining sensor data collected from one or more sensors of one or more devices traveling on either road link of the at least two road links connected at an intersection point. The approach also involves aggregating the sensor data to said either road link of at least two road links. The approach further involves filtering the sensor data based on a distance threshold from the intersection point. The approach further involves determining a traffic incident on said either road link based on the filtered sensor data.

20 Claims, 16 Drawing Sheets

(56) References Cited

U.S. PATENT DOCUMENTS

| | | | | |
|---|---|---|---|---|
| 11,270,578 | B2* | 3/2022 | Pietrobon | G08G 1/0141 |
| 11,501,637 | B2* | 11/2022 | Xu | G08G 1/0145 |
| 2003/0018428 | A1* | 1/2003 | Knockeart | G08G 1/096872 |
| | | | | 342/357.31 |
| 2010/0256903 | A1 | 10/2010 | Johnson | |
| 2011/0307165 | A1* | 12/2011 | Hiestermann | G01C 21/3492 |
| | | | | 701/119 |
| 2015/0095830 | A1* | 4/2015 | Massoumi | G08G 1/0145 |
| | | | | 715/771 |
| 2015/0170514 | A1* | 6/2015 | Stenneth | G08G 1/0125 |
| | | | | 701/117 |
| 2015/0308841 | A1* | 10/2015 | Matsunaga | G01C 21/30 |
| | | | | 701/428 |
| 2016/0275786 | A1* | 9/2016 | Fowe | G08G 1/0141 |
| 2019/0189001 | A1* | 6/2019 | Smothers | G08G 1/0104 |
| 2019/0251838 | A1* | 8/2019 | Bernhardt | G08G 1/087 |
| 2020/0018607 | A1* | 1/2020 | Balu | H04W 12/02 |
| 2020/0090503 | A1* | 3/2020 | Rolf | G08G 1/0116 |
| 2020/0105134 | A1* | 4/2020 | Pietrobon | G08G 1/0133 |
| 2020/0111349 | A1* | 4/2020 | Mubarek | G08G 1/052 |
| 2020/0158530 | A1* | 5/2020 | Xu | G08G 1/095 |
| 2020/0378783 | A1* | 12/2020 | Neubauer | G06N 5/04 |
| 2021/0026360 | A1* | 1/2021 | Luo | G06N 20/00 |
| 2021/0095975 | A1* | 4/2021 | Mubarek | G08G 1/0141 |
| 2021/0104155 | A1* | 4/2021 | Xu | B60W 50/14 |
| 2021/0231444 | A1* | 7/2021 | Mudda | G01C 21/32 |
| 2021/0300410 | A1* | 9/2021 | Dorum | G08G 1/056 |
| 2021/0404818 | A1* | 12/2021 | Xu | G01C 21/3461 |
| 2022/0013014 | A1* | 1/2022 | Xu | G01C 21/3697 |
| 2022/0018674 | A1* | 1/2022 | Xu | G06Q 10/08355 |
| 2022/0074751 | A1* | 3/2022 | Klang | G06N 20/00 |
| 2022/0357181 | A1* | 11/2022 | Vitale | G08G 1/04 |

OTHER PUBLICATIONS

Pietrobon et al., "An algorithm for road closure detection from vehicle probe data." ACM Transactions on Spatial Algorithms and Systems (TSAS) vol. 5, No. 2, Article 12, published Jul. 2019, 13 pages.

* cited by examiner

METHOD, APPARATUS, AND SYSTEM FOR DETECTING ROAD INCIDENTS

RELATED APPLICATION

This application claims priority from U.S. Provisional Application Ser. No. 63/079,262, entitled "METHOD, APPARATUS, AND SYSTEM FOR DETECTING ROAD INCIDENTS," filed on Sep. 16, 2020, the contents of which are hereby incorporated herein in their entirety by this reference.

BACKGROUND

Providing data on traffic anomalies or incidents (e.g., abnormalities in traffic that can affect traffic flow such as accidents, lane closures, road closures, etc.) is an important function for mapping service providers. While most traffic anomalies can have at least some negative impact on traffic, road closures can be the most severe because vehicles are unable to travel through the affected roadway. However, obtaining accurate, real-time traffic information regarding road closures or any other road incident is particularly challenging. For instance, due to location sensor accuracy limitations and/or map matching errors, probe points on one path can be mis-matched to nearby paths or road links (e.g., ramps, highway connectors, etc.), or vice versa. Accordingly, mapping service providers face significant technical challenges to detect a traffic incident (e.g., a road closure) on a path or road link that is within an error distance of another path (e.g., a "nearby path").

Some Example Embodiments

Therefore, there is a need for an approach for detecting and/or verifying a traffic incident (e.g., a road closure) on one of nearby paths that are susceptible to location sensor errors digital map errors, and/or map mis-matching errors.

According to one embodiment, a method comprises determining sensor data collected from one or more sensors of one or more devices traveling on either road link of at least two road links connected at an intersection point. The method also comprises aggregating the sensor data to said either road link of the at least two road links. The method further comprises filtering the sensor data based on a distance threshold from the intersection point. The method further comprises determining a traffic incident on said either road link based on the filtered sensor data.

According to another embodiment, an apparatus comprises at least one processor, and at least one memory including computer program code for one or more computer programs, the at least one memory and the computer program code configured to, with the at least one processor, cause, at least in part, the apparatus to determine sensor data collected from one or more sensors of one or more devices traveling on either road link of at least two road links connected at an intersection point. The apparatus is also caused to aggregate the sensor data to said either road link of the at least two road links. The apparatus is further caused to filter the sensor data based on a distance threshold from the intersection point. The apparatus is further caused to determine a traffic incident on said either road link based on the filtered sensor data.

According to another embodiment, a non-transitory computer-readable storage medium carries one or more sequences of one or more instructions which, when executed by one or more processors, cause, at least in part, an apparatus to determine sensor data collected from one or more sensors of one or more devices traveling on either road link of at least two road links connected at an intersection point. The apparatus is also caused to aggregate the sensor data to said either road link of the at least two road links. The apparatus is further caused to filter the sensor data based on a distance threshold from the intersection point. The apparatus is further caused to determine a traffic incident on said either road link based on the filtered sensor data.

According to another embodiment, an apparatus comprises means for determining sensor data collected from one or more sensors of one or more devices traveling on either road link of at least two road links connected at an intersection point. The apparatus also comprises means for aggregating the sensor data to said either road link of the at least two road links. The apparatus further comprises means for filtering the sensor data based on a distance threshold from the intersection point. The apparatus also comprises means for determining a traffic incident on said either road link based on the filtered sensor data.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for detecting a traffic incident on one of nearby paths are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
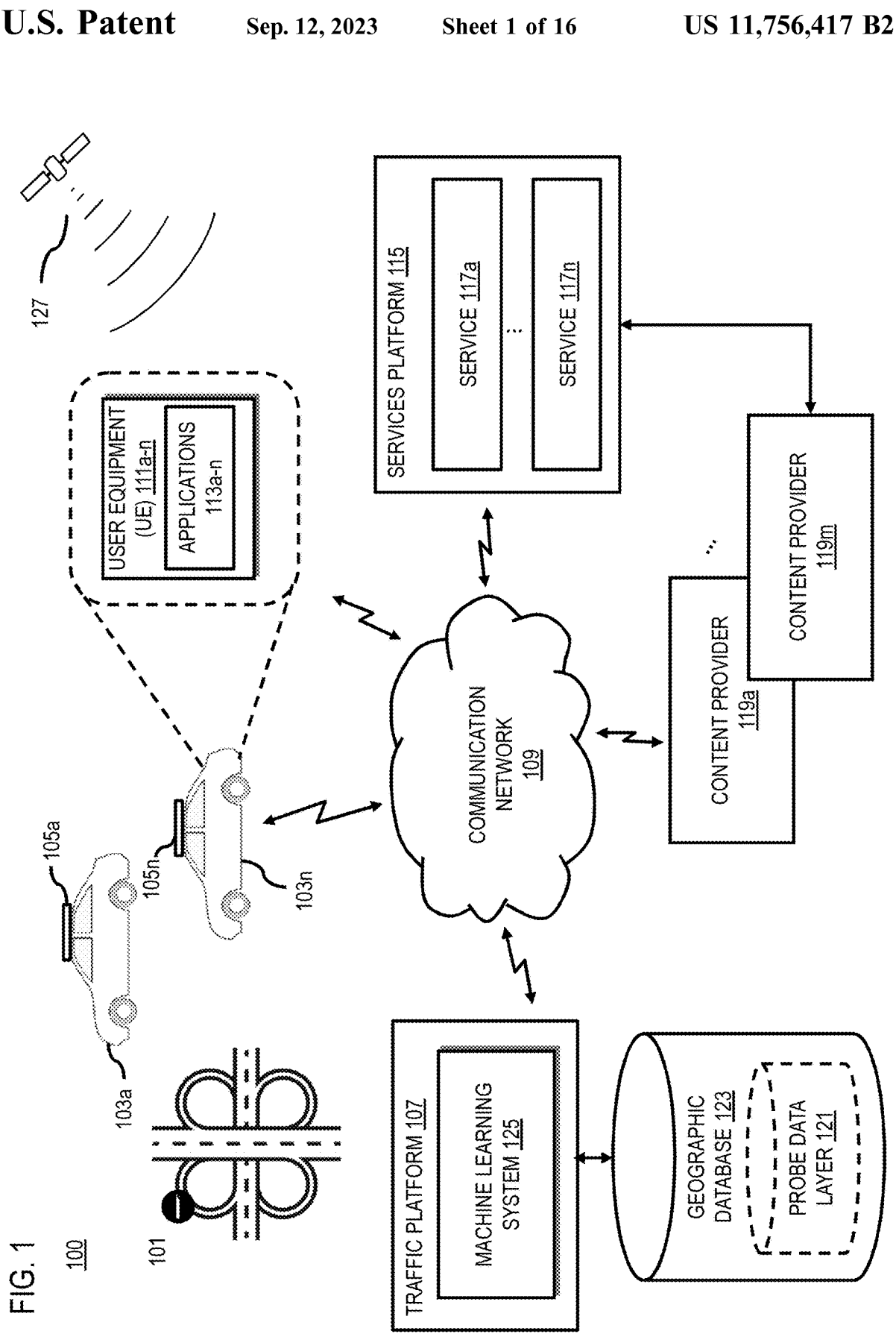
FIG. 1 is a diagram of a system capable of detecting a traffic incident on one of nearby paths, according to one embodiment.

FIG. 1 is a diagram of a system 100 capable of detecting a road incident (e.g., a road closure 101) on one of nearby paths, according to one embodiment. As mentioned above, providing data on traffic anomalies or incidents (e.g., abnormalities in traffic that can affect traffic flow such as accidents, lane closures, road closures, etc.) is an important function for mapping service providers. While most traffic anomalies can have at least some negative impact on traffic, road closures can be the most severe because vehicles are unable to travel through the affected roadway. Real-time road closure information can provide the drivers the most up-to-date pre-warning of road closure and re-routing accordingly.

Figure 2:
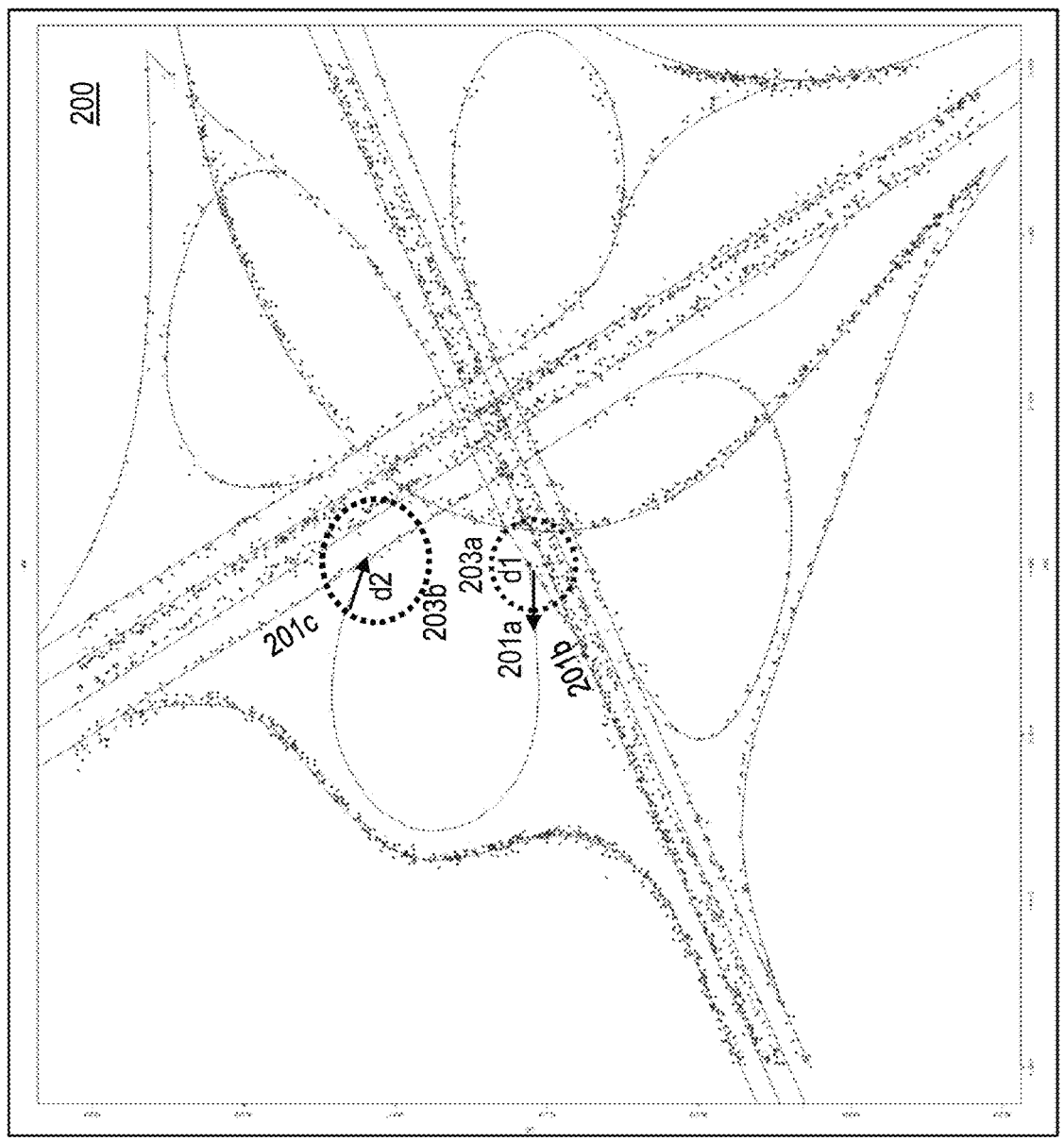
FIG. 2 is a diagram illustrating an example interchange with nearby paths that are susceptible to location sensor errors, digital map data errors, and/or map mis-matching errors, according to one embodiment.

Currently, vehicle sensors are employed to make a judgment if a given link is closed. When vehicle sensor data points are map-matched onto a link over a time period, that link is determined as open; otherwise, that link is determined as closed. However, certain road topologies with nearby paths, such as near a link split/merge location, a ramp, etc. incur map-matching errors. Near these locations, the uploaded vehicle sensor data can be mis-matched onto a ramp, when the vehicle is traversing on a main road, or vice versa. This problem can happen on a bifurcated road, a ramp, a frontage road, a service road, a highway connector, etc. FIG. 2 is a diagram illustrating an example interchange 200 with nearby paths that are susceptible to location sensor errors, digital map data errors, and/or map mis-matching errors, according to one embodiment. FIG. 2 shows probe data points that are vehicle traces extracted from the sensor data. It is apparent to human eyes that a ramp 201a is close since there are no vehicle trace thereon. However, the start of the ramp 201a is close to a road 201b while the end of the ramp 201a is close to a road 201c, such that some vehicle trace points on the roads 201b, 201c can be mis-matched to the ramp 201a due to location sensor data errors, digital map errors, and/or map-matching process errors. As a result, the ramp is deemed to be open when applying a path-based map-matcher on the mis-matched vehicle trace points.

The location sensor data errors may include atmospheric interference, calculation and rounding errors, ephemeris (orbital path) data errors, multi-path effects, etc. The digital map errors may include topological and geometric errors, missing links, extra links and digitization errors, etc. The map-matching process errors may be caused by algorithms of candidate link identification, total weight score calculation, consistence checks, etc.

There is another issue associated with applying a path-based map-matcher to upstream and downstream vehicle trace data in order to increase map-matching accuracy. Comparing to a point-based map-matcher, the path-based map-matcher needs to process tens or even hundreds more upstream and downstream vehicle location data points that is time-consuming and costly. With the increasing amount of vehicle location data points, the path-based map-matcher cannot process in real-time.

To address these problems, the system 100 of FIG. 1 introduces a capability to detect a road closure by filtering mis-matched sensor data points (e.g., vehicle trace points)

on nearby paths. In one embodiment, the system 100 can define a distance threshold d1 for vehicle trace points in a buffer area (e.g., a circle area 203a) near the ramp start, and a distance threshold d2 for vehicle trace points in a buffer area (e.g., a circle area 203b) near the ramp end, thereby filtering away the vehicle trace points in the circle areas 203a, 203b. After filtering away these noise data, the system 100 can determine whether the ramp is closed based on the remaining trace data points matched to the ramp 201a. Therefore, the system 100 provide a robust and real-time detection solution of road closure on one of nearby paths.

Besides the U-shaped ramp shown in FIG. 2, the system 100 can apply the same approach to detect a road closure or a facility closure in other scenarios, such as a bifurcated road, a frontage road, a maneuver road, a reversible lane, a point of interest (POI), etc. A frontage road can be an access road, a service road a parallel road that runs parallel to a higher-speed, limited-access road. A reversible lane can be a lane in which traffic may travel in either direction, depending on certain conditions.

FIGS. 3A-3G are diagrams illustrating examples of nearby paths or facilities that are susceptible to location sensor errors, digital map data errors, and/or map mismatching errors, according to one embodiment. One application is to detect whether a road link is closed or not. When there are no map-matched point after a distance threshold from an intersected point or the like, the system 100 can determine the road link is closed. Another application is to determine a true route of the vehicles when two bifurcated roads are nearby (e.g., approximately equivalent), thereby pathing/routing the vehicles correctly.

Figure 3C:
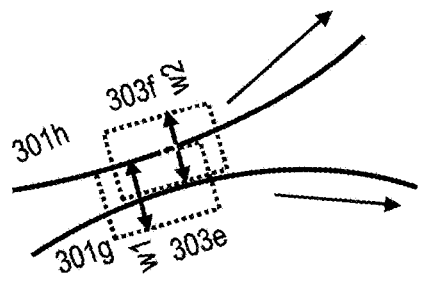
FIGS. 3A-3G are diagrams illustrating examples of nearby paths or facilities that are susceptible to location sensor errors, digital map data errors, and/or map mis-matching errors, according to one embodiment.
Figure 3D:
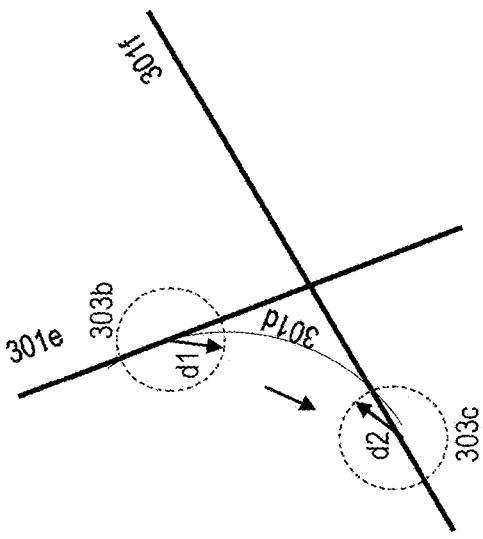
Figure 3A:
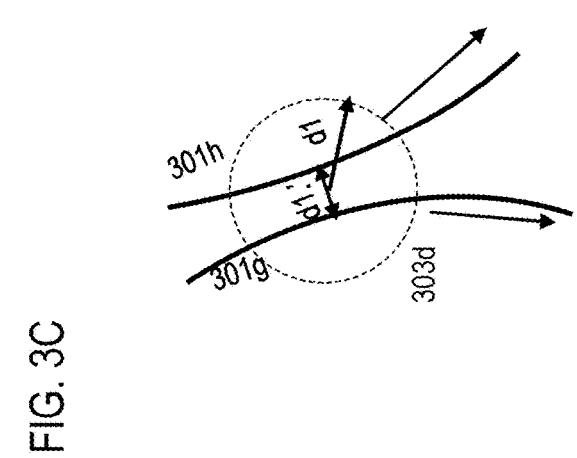

FIG. 3A depicts a road link 301a bifurcates into a downstream road link 301b and a downstream road link 301c at an intersection point. In this embodiment, the system 100 can define a distance threshold d1 for vehicle trace points in a buffer area (e.g., a circle area 303a) around the intersection point to filter away the vehicle trace points in the circle area 303a. By way of example, the distance threshold can be determined based on a predicted error associated with map-matching a probe point to a road link. In other words, the location of a probe point falling within the circle area 303a may not be known with enough certainty (e.g., certainty beyond the distance threshold or probe map matching error) to be able to determine on which of the road links 301a, 301b, or 301c the probe point should be map matched.

In one embodiment, the distance threshold d1 can be defined using any distance metric from an intersection point. For example, in one embodiment, the geographic database 123 can include digital map data that uses a node/link representation of a road network. This node/link representation generally represents a road network by assigning a node to represent an intersection or other location where two or more roads meet or diverge, and then a road link represents the road segment between any two nodes or intersections. Thus, a road link can be defined by specifying a beginning node and ending node of the road link, e.g., with respect to a direction of travel on the road link. Based on this node/link representation, the distance threshold can be defined using an offset from the beginning node of each road link. In one embodiment, the offset is specified as distance value from the beginning node to identify any point along the road link up to the ending node.

As shown in the example of FIG. 3A, the distance threshold d1 represents the distance threshold along the length of a road link. For example, the distance threshold d1 can be used in cases in which the intersection point is a connection point between an upstream road link and a downstream link (e.g., between upstream link 301a and downstream links 301b/301c). In these cases, the map matching uncertainty or error means that is uncertain whether a map matched probe point within this the distance threshold of the intersection is still on the upstream link or has moved onto one of the downstream links. This can be particularly problematic, for instance, if one of the downstream links (e.g., downstream link 301b) is a continuation of the road or highway while the other downstream link (e.g., downstream link 301c) is an off ramp from the highway and it is uncertain which road link (e.g., road links 301a-301c). In this scenario, there would be uncertainty over whether the probe points within the threshold distance d1 are still on the highway or on the ramp or other equivalent road bifurcation.

In another embodiment, an equivalent distance threshold d1' can defined between two different road links (e.g., road links 301b and 301c) that approach each other within the distance threshold without necessarily being connected by an intersection or where the intersection is further upstream beyond the distance threshold d1. For example, downstream road link 301b may approach downstream road link 301c within the distance threshold d1' so that it is uncertain whether a probe point within the area defined by the distance threshold d1' should be map matched to downstream road link 301b or to downstream road link 301c.

After filtering away the probe data points in the buffer area (e.g., probe points within map-matching uncertainty above a threshold value), the system 100 can determine whether one of the downstream road links 301b, 301c is closed based on the remaining trace data points map-matched to the roads 301b, 301c.

Figure 3B:
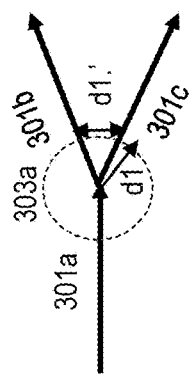

FIG. 3B depicts a ramp 301d of a different geometry. Similar to FIG. 2, the system 100 can determine d1 for a circle area 303b around a ramp starting point (e.g., defined by a minimum offset from the ramp beginning node), d2 a circle area 303c around a ramp end point (e.g., defined by a maximum offset from the ramp beginning node), to filter away mis-matched vehicle trace data points, thereby determining whether the ramp 301d is close or open. The ramp 301d splits from a road 301e and then merges into a road 301f. In this embodiment, the system 100 can extract sensor data points located near the split/merge, aggregate the sensor data points in each road link using a point-based map-matcher, and then determine distance thresholds from the split/merge locations and make a road closure detection.

Similarly, distance thresholds d1, d2 can be defined as a distance from a vehicle trace point map-matched onto the ramp 301d to the ramp starting point and the ramp end point respectively. In one embodiment, the distance threshold d1', d2' can be defined as an offset from a vehicle trace point map-matched onto the ramp 301d to the road 301e and the road 301f respectively.

A split in FIG. 3A can be processed using only d1/d1' (excluding one set of mismatched probe points), while a ramp in FIG. 3B can be processed additionally using d2/d2' (excluding another set of mismatched probe points) as a verification or double-assurance of the ramp closure. A closure can be detected on either the main road or the ramp.

FIGS. 3C-3D depicts two roads 301g, 301h close to each other. In this embodiment, since there is no connecting point between the roads, the system 100 can determine a buffer area defined by a distance threshold, or a pair of buffer areas, to filter away mis-matched vehicle trace data points therein, thereby determining whether the roads 301g, 301h approach within a the distance threshold so as to increase the potential incorrect map-matching to a road link. In FIG. 3C, a distance threshold d1 can start from a center point between the closest points of the two roads 301g, 301h to define an area 303d, while a distance threshold d1' is a closest distance from a vehicle trace point to road 301g or road 301h. The probe points falling with the area 303d defined by the distance threshold d1 and/or d1' are considered to be associated with a higher degree of map matching uncertainty (e.g., uncertainty as to whether they should be map matched to road link 301g or 301h). The probe points in the 303d can then be filtered or eliminated from use in determining a road closure or other road incident on either road 301g or road 301h.

In FIG. 3D, the pair of buffer areas may include a buffer area (e.g., a rectangular area 303e) with a width w1 for the road 301g, and a buffer area (e.g., a rectangular area 303f) with a width w2 for the road 301h. By filtering away mis-matched vehicle trace data points in the buffer areas, the system 100 can determine whether either of the roads 301g, 301h is close downstream of the buffer areas. The same approach can be applied to a frontage road (e.g., an access road, service road, etc.) that runs parallel and/or close to a main road, to determine whether either of the frontage road or the main road is closed downstream.

Figure 3G:
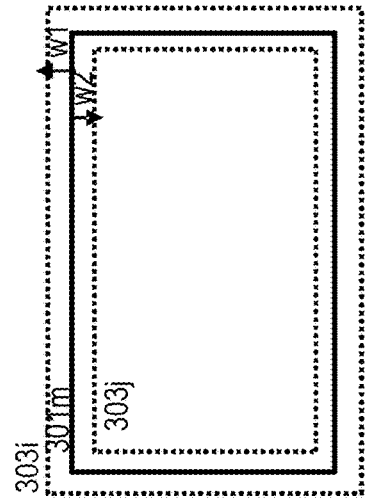
Figure 3E:
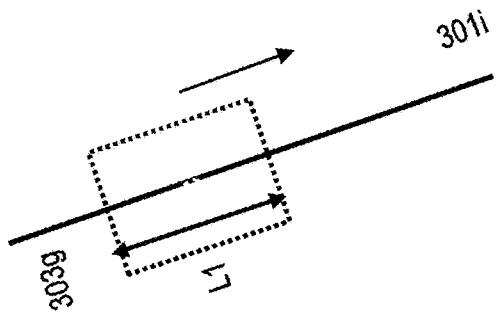

FIG. 3E depicts a single road 301i. In this embodiment, the system 100 can extract sensor data points located near a buffer area (e.g., a rectangular area 303g) with a length L1 where a vehicle trace data point density drops down to a density threshold yet above zero, and then make a road closure detection downstream from the rectangular area 303g. By way of example, the road 301i was blocked by a garbage truck right after the rectangular area 303g; however, there were vehicles turning around in the rectangular area 303f and left some vehicle trace data points.

Figure 3F:
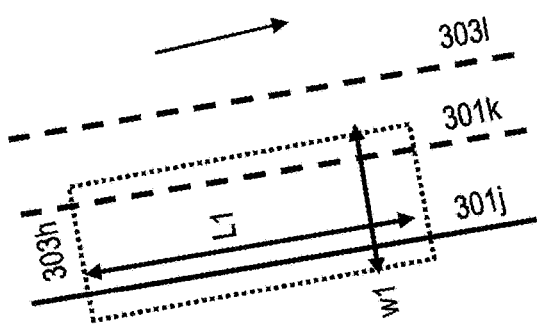

FIG. 3F depicts lanes 301j, 301k, 301l on a single road and how to detect a lane-level closure. In this embodiment, the system 100 can extract sensor data points located near a buffer area (e.g., a rectangular area 303h) with a length L1 and a width w1 on the lane 301j where a vehicle trace data point density drops down to a density threshold yet above zero, and then make a lane closure detection downstream from the lane 301j. By way of example, the lane 301j was blocked by an accident vehicle right after the rectangular area 303h; however, there were vehicles circumventing around the rectangular area 303h and left some vehicle trace data points. The same approach can be applied a center lane, an inner lane, a reversible lane (which traffic may travel in either direction depending on traffic conditions), etc., to determine whether any of the lanes is close.

FIG. 3G depicts a point of interest (POI) with a boundary 301m. In this embodiment, the system 100 can extract sensor data points located near an outer buffer area with a width w1 (e.g., a rectangular frame 303i outside of the boundary 301m) and an inner buffer area with a width w2 (e.g., a rectangular frame 303j inside of the boundary 301m), where visitor trace data point density drops down to a density threshold yet above zero, and then make a POI closure detection. By way of example, the POI is a supermarket close after 8:00 pm; however, there were people lingering around the check-out area near the entrance, or waiting outside to be picked up thus left some trace data points in the buffer areas.

The distance thresholds d1, d2, d1 d2', widths w1, w2, and length L1 can be heuristically defined either as a fix value, as the total length of the road link/POI dimensions multiplied by a fixed or configurable ratio, etc. In another embodiment, the system 100 can apply one or more machine learning models to determine optimal distance thresholds/widths/length for different scenarios in different regions considering factors, such as transport modes, traffic patterns, road topology, driving behaviors, location sensor errors, digital map data errors, map mis-matching errors, etc. that vary depending on regions (e.g., towns, city, suburbs, mountains, countries, etc.).

Taking location sensor errors as an example, the more accurate the location sensors are, the shorter the distance thresholds/widths/length can be. The positioning sensors can apply various positioning technologies, e.g., global navigation satellite systems (GNSS), WiFi, Bluetooth, Bluetooth low energy, 2/3/4/5G cellular signals, ultra-wideband (UWB) signals, etc., and various combinations of the technologies to derive probe location data of different accuracy levels. By way of example, a combination of satellite and network signals can derive a more precise vehicle location than either one of the technologies, which is important in many of the intermodal scenarios, e.g., when GNSS signals are unavailable in subway stations. In one embodiment, the system 100 can determine a subway line segment closure, based on rider location data collected via a combination of satellite and network signals.

It is noted that the term "traffic incident" refers to any occurrence on a roadway that impedes normal traffic flow. As such, traffic incidents include any recurring or non-recurring events that cause a reduction of roadway capacity or an abnormal increase in demand, such as road closures, traffic crashes, disabled vehicles, spilled cargo, highway maintenance and reconstruction projects, and special non-emergency events (e.g., ball games, concerts, or any other event that significantly affects roadway operations). Although various embodiments are described with respect to a road closure, it is contemplated that the approach described herein may be used with other traffic incidents. In addition, the terms "vehicle trace data points" and "probe data" are used interchangeably via the disclosure.

In one embodiment, the system 100 determines a traffic incident (e.g., the road closure 101) by processing sensor data from one or more vehicles 103a-103n (also collectively referred to as vehicles 103) (e.g., standard vehicles, autonomous vehicles, heavily assisted driving (HAD) vehicles, semi-autonomous vehicles, etc.). In one instance, the vehicles 103 include one or more vehicle sensors 105a-105n (also collectively referred to as vehicle sensors 105) (e.g., positioning sensors) and have connectivity to a traffic platform 107 via a communication network 109. In one embodiment, the sensor data includes probe data may be reported as probe points, which are individual data records collected at a point in time that records telemetry data for that point in time. A probe point can include attributes such as: (1) probe ID, (2) longitude, (3) latitude, (4) heading, (5) speed, and (6) time.

In one embodiment, the system 100 can also collect probe data from one or more user equipment (UE) 111a-111n (also collectively referenced to herein as UEs 111) associated with the vehicles 103 (e.g., an embedded navigation system), a user or a passenger of a vehicle 103 (e.g., a mobile device, a smartphone, a client terminal, etc.), or a combination thereof. In one instance, the UEs 111 may include one or more applications 113a-113n (also collectively referred to herein as applications 113) (e.g., a navigation or mapping application). In one embodiment, the system 100 may also collect the probe data from one or more other sources such as government/municipality agencies, local or community agencies (e.g., police departments), and/or third-party official/semi-official sources (e.g., the services platform 115, one or more services 117a-117n, one or more content providers 119a-119m, etc.). In one instance, the probe data collected by the vehicle sensors 105, the UEs 111, one or more other sources, or a combination thereof may be stored in a probe data layer 121 of a geographic database 123 or a combination thereof.

Figure 4:
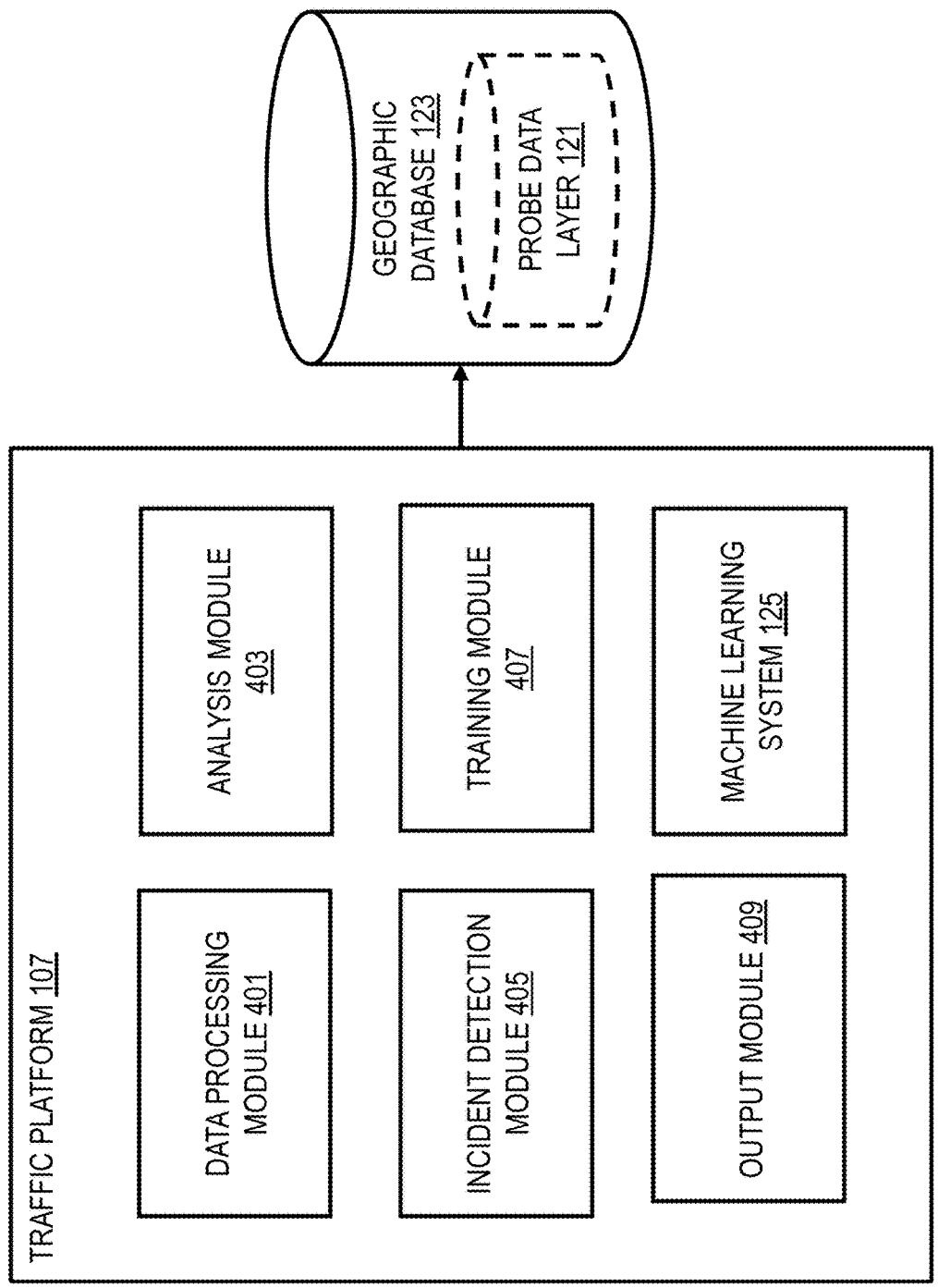
FIG. 4 is a diagram of the components of a traffic platform configured to detect a traffic incident on one of nearby paths, according to one embodiment.

FIG. 4 is a diagram of the components of the traffic platform 107, according to one embodiment. By way of example, the traffic platform 107 includes one or more components for detecting a traffic incident on one of nearby paths, according to the various embodiments described herein. It is contemplated that the functions of these components may be combined or performed by other components of equivalent functionality. In one embodiment, the traffic platform 107 includes an data processing module 401, an analysis module 403, an incident detection module 405, a training module 407, an output module 409, and a machine learning system 125, and has connectivity to the geographic database 123 including the probe data layer 121. The above presented modules and components of the traffic platform 107 can be implemented in hardware, firmware, software, or a combination thereof. Though depicted as a separate entity in FIG. 1, it is contemplated that the traffic platform 107 may be implemented as a module of any other component of the system 100. In another embodiment, the traffic platform 107 and/or the modules 401-409 may be implemented as a cloud-based service, local service, native application, or combination thereof. The functions of the traffic platform 107, the machine learning system 125, and/or the modules 401-409 are discussed with respect to FIGS. 5-10.

Figure 5:
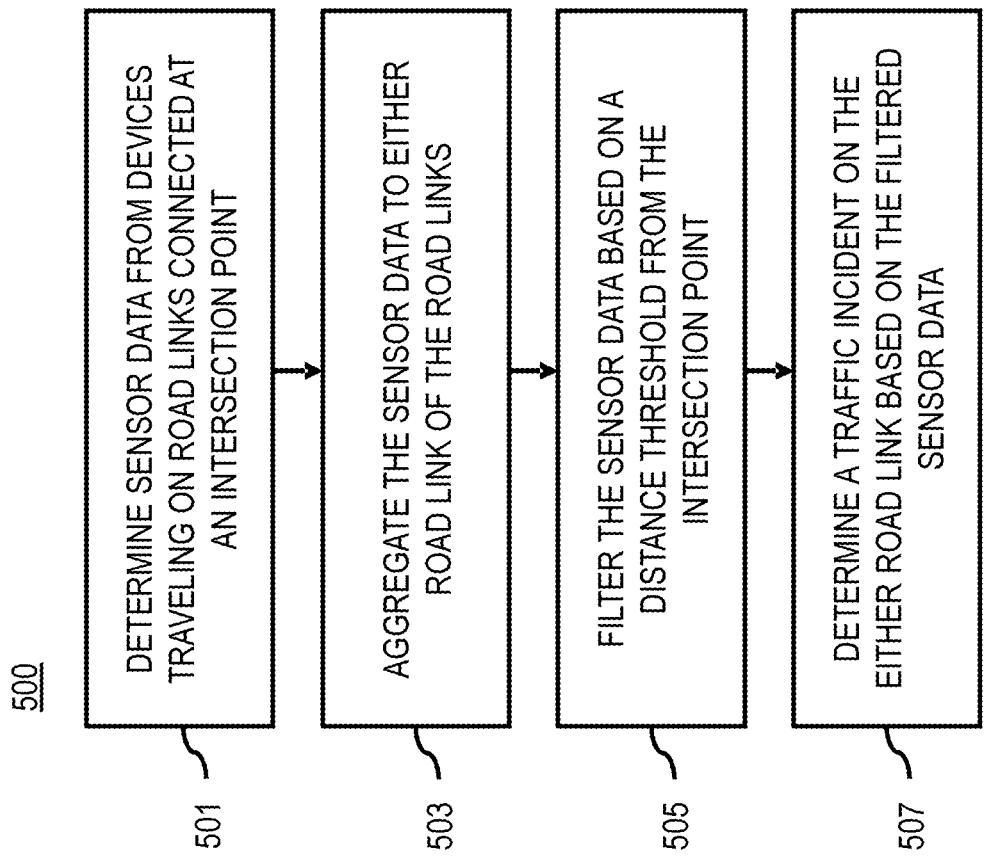
FIG. 5 is a flowchart of a process for detecting a traffic incident on one of nearby paths, according to one embodiment.
Figure 13:
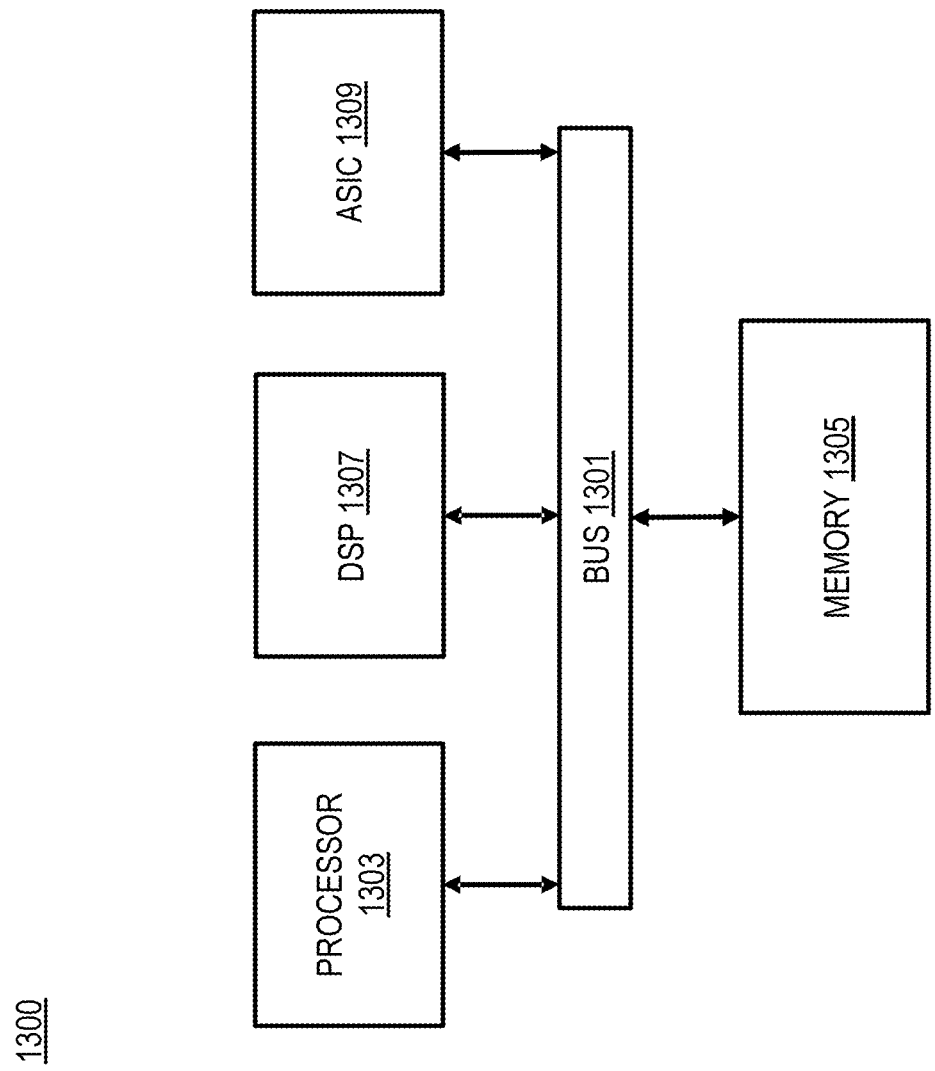
FIG. 13 is a diagram of a chip set that can be used to implement an embodiment.

FIG. 5 is a flowchart of a process for detecting a traffic incident on one of nearby paths, according to one embodiment. In various embodiments, the traffic platform 107, the machine learning system 125, and/or any of the modules 401-409 may perform one or more portions of the process 500 and may be implemented in, for instance, a chip set including a processor and a memory as shown in FIG. 13. As such, the traffic platform 107, the machine learning system 125, and/or the modules 401-409 can provide means for accomplishing various parts of the process 500, as well as means for accomplishing embodiments of other processes described herein in conjunction with other components of the system 100. Although the process 500 is illustrated and described as a sequence of steps, its contemplated that various embodiments of the process 500 may be performed in any order or combination and need not include all the illustrated steps.

In one embodiment, in step 501, the data processing module 401 can determine sensor data collected from one or more sensors of one or more devices traveling on either road link of at least two road links connected at an intersection point.

By way of example, the sensor data includes probe data. The data processing module 401 can retrieve probe data collected from vehicles 103 traveling on a road network that includes the examples of nearby paths/facilities in FIGS. 3A-3G that are susceptible to location sensor errors, digital map data errors, and/or map mis-matching errors. In one embodiment, probe data includes raw position probes (e.g., probe points) sent from vehicles 103 indicating their respective locations by, for example, a latitude and longitude pair. In another embodiment, the probe data further includes altitude of respective locations that can be applied to distinguish vehicle trace points on multiple-level roads/bridges/interchanges.

Figure 6B:
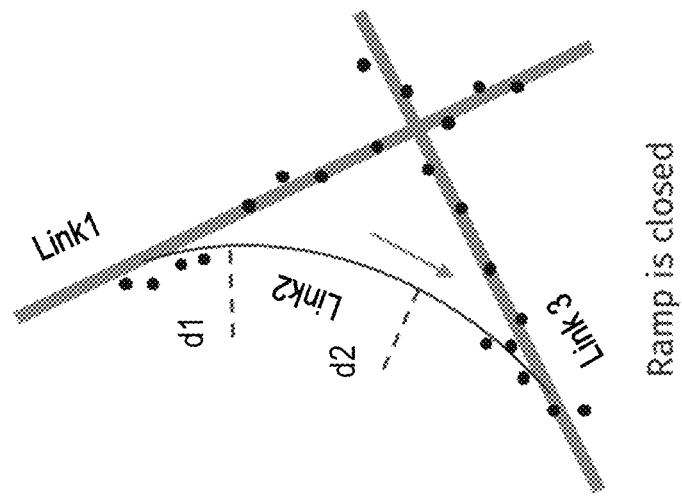
FIGS. 6A-6B are diagrams illustrating an example of detecting a traffic incident on a ramp, according to one embodiment.
Figure 6A:
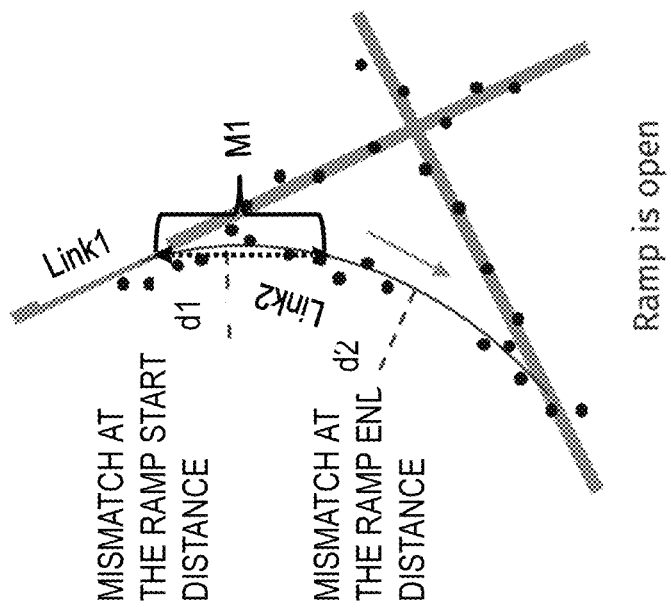

In one embodiment, the data processing module 401 can determine examples of nearby paths/facilities (e.g., a ramp-like link), based on map data retrieved from the geographic database 123. FIGS. 6A-6B are diagrams illustrating an example of detecting a traffic incident on a ramp, according to one embodiment. In one embodiment, the data processing module 401 can process map data to distinguish between a main road and a ramp, to determine an intersection point (e.g., a ramp start, a ramp end, etc.), etc.

In one embodiment, the data processing module 401 can process map data to determine that a first link of the at least two road links is a ramp link based on determining that the first link has a fewer number of lanes than a second link of the at least two links. In one embodiment, the analysis module 403 can determine that the either road link is a ramp link based on a speed attribute, a heading attribute, or a combination thereof of the either road link queried from map data.

By way of example, the data processing module 401 can apply a 3-step logic to find a ramp link in FIG. 6A as follows. When Link 1 has less number of lanes than Link 2 (e.g., data from LANE_CATEGORY in the geographic database 123), Link 1 is taken as a ramp link. When both Link 1 and Link 2 have the same number of lanes, if Link 1 does not map to a speed threshold (e.g., 60 mph) and Link 2 maps to the speed threshold or beyond, Link 1 is taken as a ramp link. When none of the links maps to the speed threshold, or both links map to the speed threshold, Link 1 is taken as a ramp link if a heading difference of Link 1 to the main link is larger than that of Link 2.

Once the ramp link is identified, the analysis module 403 can leverage the existing analysis algorithms (e.g., map-matching method and systems) to find the vehicle trace locations near the ramp of the main road to detect a traffic incident (e.g., a traffic closure) thereon. As the main road (e.g., Link 1) is bigger and less susceptible to location sensor errors, digital map data errors, and/or map mis-matching errors, FIGS. 6A-6B depict the ramp (e.g., Link 2) as an example to detect a traffic incident thereon.

In one embodiment, in step 503, the analysis module 403 can aggregate the sensor data to the either road link of the at least two road links. In one embodiment, the aggregating of the sensor data is based on a map-matcher (e.g., a path-based map-matcher, a point-based map-matcher, etc.). In one instance, the analysis module 403 can place/aggregate each probe point onto a most probable link on a digital map retrieved from the geographic database 123 using a map matching process. A digital map is defined by a set of links and their geographic coordinates. Because location positioning technologies are susceptible to location sensor errors, digital map errors, and/or map mis-matching errors, the coordinates of a vehicle sensor 105 (e.g., a probe location data point) often do not fall correctly onto a road link. To account for the errors, the analysis module 403 (e.g., using one or more map matching algorithms) takes the coordinates of a probe, and finds the neighboring road links whose coordinates are close to the probe. The system 100 then places the probe location data point onto the most probable road link based on pre-defined criteria of the map matching process or algorithm being used. In another embodiment, to better control for map matching errors, the analysis module 403 can apply a combination of map matchers instead of a single map matcher.

In one embodiment, in step 507, the incident detection module 405 can determine a traffic incident on the either road link based on the filtered sensor data obtained from the step 505 that does not contain data points in the buffer area (e.g., probe points associated with higher map matching uncertainty). By way of example, the traffic incident is a road closure, and the road closure is determined based on a number of data points of the sensor data upstream from the distance threshold. In addition, the road closure is based on determining that the number of data points beyond the distance threshold from the intersection point is below a threshold number. The threshold number is preferably zero, yet can be more. For example, there can be one or more maintenance vehicles or abandoned vehicles still on a closed road segment.

By way of example, the analysis module 403 can aggregate the sensor data in each link applying a fast point-based map-matcher. When a map-matcher mis-matches vehicle trace data points on the main road (especially near the start/end of the ramp) to the ramp, the road is mistaken as open. To avoid such situations, the analysis module 403 can ensure that the map-matched points be far enough through from the ramp start/end using distance thresholds to the ramp, such that the incident detection module 405 can exclude/filter away mis-matched vehicle trace data points and make a road closure detection. The analysis module 403 can aggregate the sensor data which are map-matched on the ramp/Link 2 and identify the sensor data which may be mismatched near the ramp start and ramp end as shown in FIGS. 6A-6B.

In one embodiment, in step 505, the incident detection module 405 can filter the sensor data based on the threshold distances d1 and d2. By way of example, given all the vehicle location data points that are map-matched to Link 2 (e.g., the ramp), the incident detection module 405 can exclude those location data points whose distance from the ramp start are shorter than a distance threshold d1. In addition, the incident detection module 405 can exclude those location data points whose distance from the ramp end are shorter than a distance threshold d2. These distance thresholds d1, d2 in FIG. 6A can be defined either as a fix value or as the total length of the ramp multiplied by a ratio (e.g., ratio is configurable). This means only the vehicle location data points in the downstream of d1 and upstream of d2 are extracted. If no vehicle location data points in-between d1 and d2, the incident detection module 405 can take the ramp as closed. If there are one or more vehicle location data points in-between d1 and d2, the incident detection module 405 can take the ramp as open.

In another embodiment, the incident detection module 405 can starting offset of vehicle trace data points on the links (e.g., Link 2 in FIG. 6A). Map-matched vehicle trace data points on closure links may have the following features. For an open link, the map-matched vehicle location data points can have (1) comparatively smaller offsets (from the main road, Link 1) than the threshold distance d1, if they are mismatched at and/or near the start of the ramp, and (2) comparatively large offsets (from the main road, Link 1) than the threshold distance d2 if they are mismatched at and/or near the end of the ramp as shown in FIG. 6A. For a closure link, there is no vehicle location data point with an offset value between the threshold distances d1 and d2 as shown in FIG. 6B.

By way of example, a closure can determined by maximum offsets of the points are larger than a distance threshold d1 from an upstream intersection point and a distance threshold d2 from a downstream intersection point. If a point as described exists, the system 100 can determine that the road segment is open. Otherwise, the road segment is closed.

In one instance, for those extracted/filtered vehicle location data points, the incident detection module 405 can determine whether a maximum offset M1 of the filtered sensor data relative to a starting point of the ramp (being larger than the distance threshold d1 and smaller than the threshold distance d2) exists. The ramp is determined as open based on the existence of the maximum offset M1 as in FIG. 6A. The ramp is determined as closed based on the nonexistence of the maximum offset M1 as in FIG. 6B.

In a scenario of two nearby road (e.g., FIGS. 3C-3D), the system 100 can determine sensor data collected from one or more sensors of one or more devices traveling on a road link, aggregate the sensor data to the road link, filter the sensor data corresponding to at least one section of the road link that is located within a distance threshold (e.g., d1, d1' in FIG. 3C, w1, w2 in FIG. 3D) from at least one other road link, and determine a traffic incident on the road link based on the filtered sensor data. By way of example, the traffic incident is a road closure, and the road closure is determined based on a number of data points of the sensor data outside of the distance threshold. The road closure is based on determining that the number of data points beyond the distance threshold d1 is below a threshold number. The threshold number is preferably zero, yet can be more. For example, there can be one or more maintenance vehicles or abandoned vehicles still on a closed road link.

In a scenario of a point of interest (e.g., FIG. 3G), the system 100 can determine sensor data collected from one or more sensors of one or more devices traveling within a threshold proximity of a point of interest, filter the sensor data based on a distance threshold (e.g., w1, w2 in FIG. 3G) from a boundary location of the point of interest, and determine a positioning of the one or more devices relative to point of interest based on filtered sensor data. The positioning includes an indoor positioning within the point of interest (e.g., a library, supermarket, etc.), and the positioning is based on a number of data points of the sensor data outside of the distance threshold. In one embodiment, the distance threshold is based on a positioning accuracy of the one or more sensors. By way of example, unexpected events (e.g., fire, protests, earthquakes, hurricane, etc.) can interrupt points of interest (POIs) hours, such that regular online posted store hours become unreliable. To determine whether a POI (e.g., a supermarket) is closed, the system 100 can filter away noise data (e.g., foot traffic data points right outside the store entrance or around the store walls, etc.), and determine the closed status based on whether there are remaining foot traffic data points inside the store.

The distance thresholds d1, d2, d1', d2' can be heuristically defined either as a fix value considering the length of the topology link, such as the total length of the road link/POI dimensions multiplied by a fixed or configurable ratio, etc. For example, the distance threshold d2 can be set as around 70% of the total length of the ramp link or a fix value of around 80 meters. In another embodiment, the system 100 can apply one or more machine learning models to determine optimal distance thresholds for different scenarios.

Figure 7:
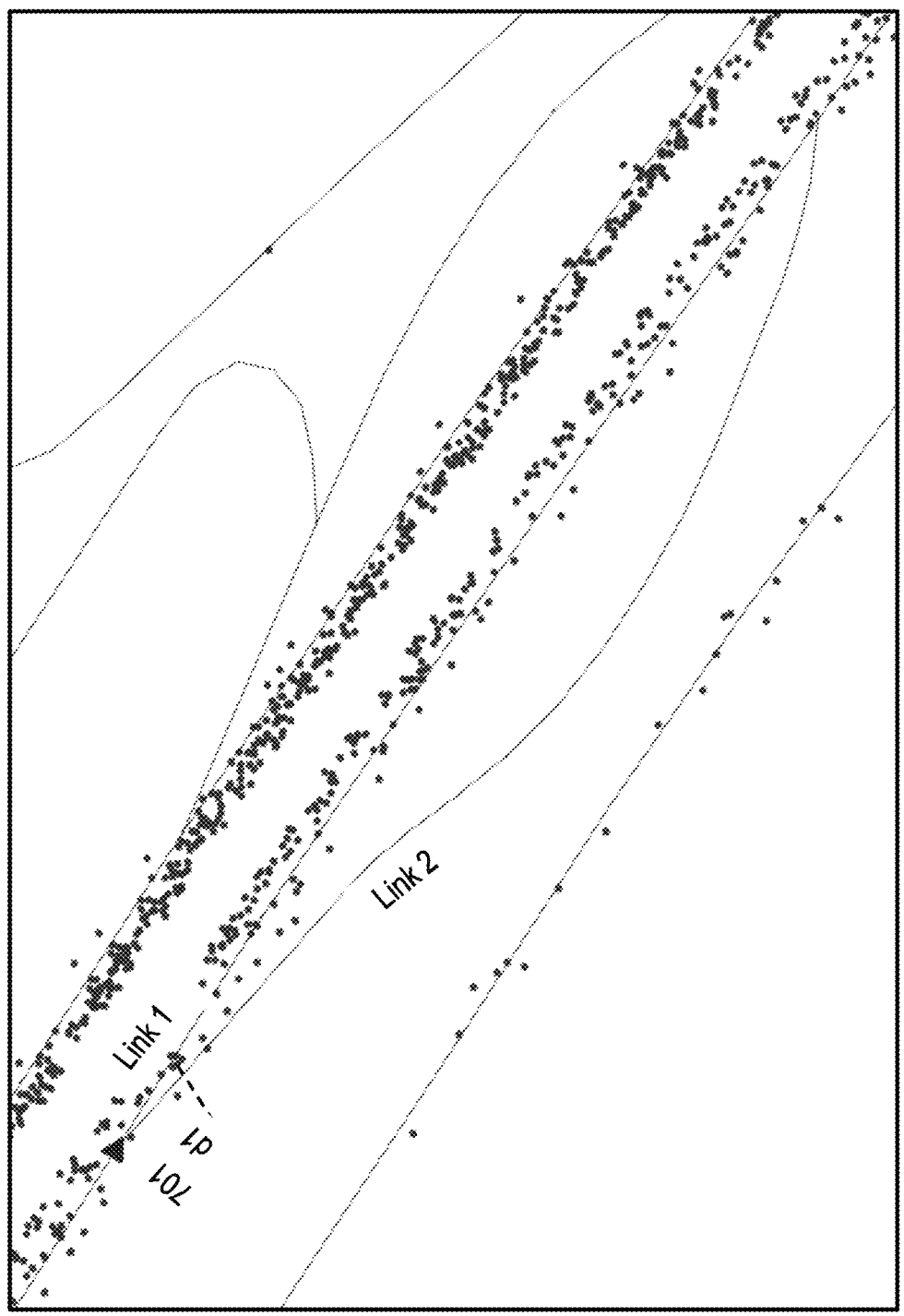
FIG. 7 is a diagram illustrating an example road closure that may not be detected when a distance threshold is set too small, according to one embodiment.

The changes of the distance thresholds affect the results. By way of example, FIG. 7 is a diagram illustrating an example road closure that may not be detected when a distance threshold is set too small, according to one embodiment. In FIG. 7, Link 2 splits form Link 1 at a point 701. When Link 2 has a long segment close to Link 1 and a distance threshold d1 sets too small, a lot of vehicle trace data points on Link 1 will be mismatched to Link 2 downstream of d1, such that the system 100 cannot identify Link 2 as closed.

Figure 8:
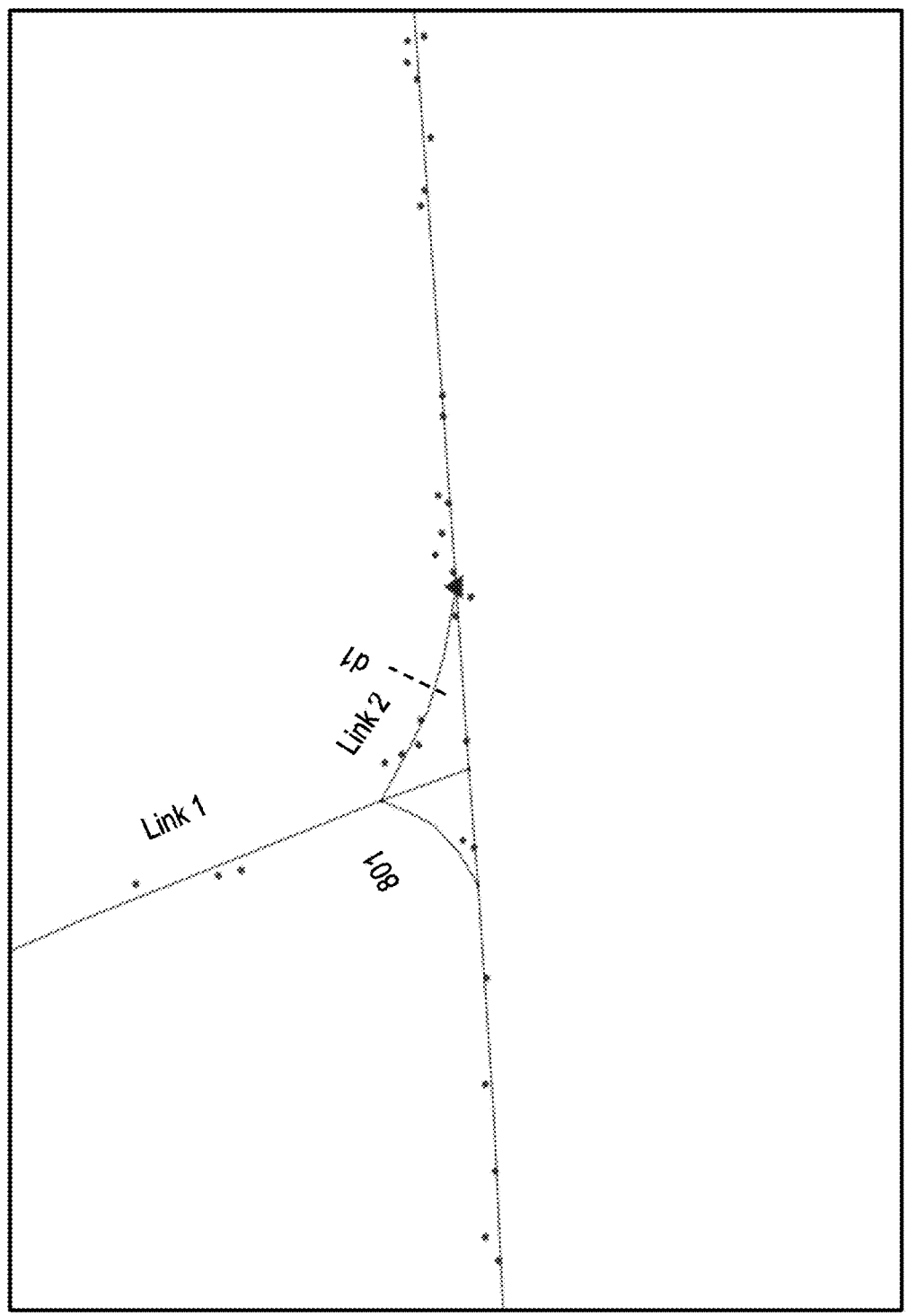
FIG. 8 is a diagram illustrating an example road closure that may not be detected when a distance threshold is set too large, according to one embodiment.

As another example, FIG. 8 is a diagram illustrating an example road closure that may not be detected when a distance threshold is set too large, according to one embodiment. In FIG. 8, Link 2 splits form Link 1 at a point 801. When a distance threshold d1 sets too large, a lot of vehicle trace data points mapped to Link 2 are excluded upstream of d1, such that the system 100 can identify Link 2 as closed by mistake.

Figure 9:
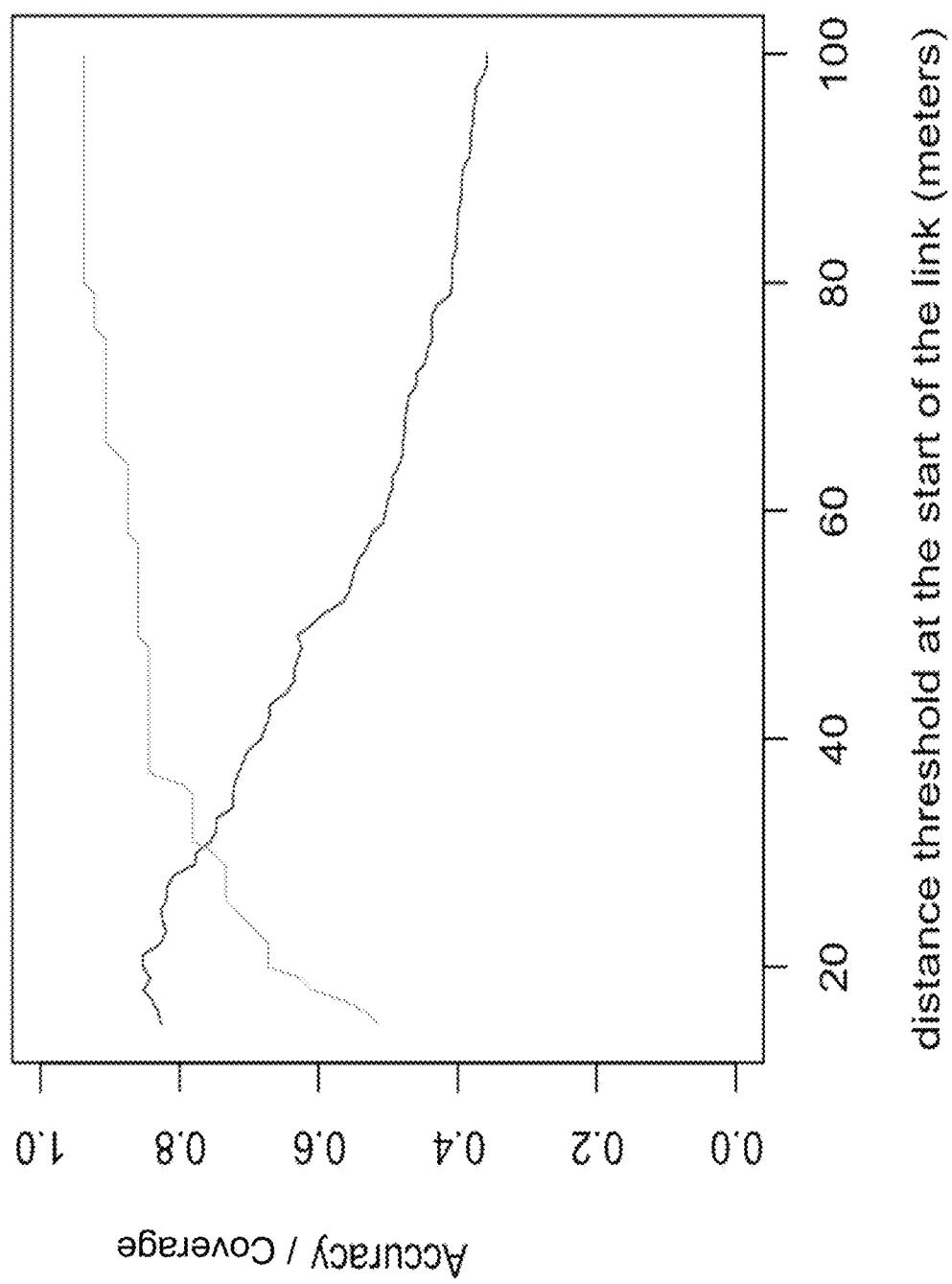
FIG. 9 is a diagram illustrating correlations between accuracy/coverage and a distance threshold, according to one embodiment.

To assess the accuracy of the above-discussed embodiments (e.g., FIGS. 6A-6B) and fine tune the distance thresholds, the system 100 can vary the distance threshold d1, to obtain different levels of accuracy and coverage. FIG. 9 is a diagram illustrating correlations between accuracy/coverage and a distance threshold, according to one embodiment. By way of example, the accuracy is calculated as the number of correct cases divided by the total number of identified closed link cases. As shown in FIG. 9, the thick line of the accuracy decreases with the increase of d1. The coverage is calculated as the number of correct cases detected by the above-discussed embodiments divided by all the ground truth closed links in the area. As shown in FIG. 9, the thin line of the coverage increases with the increase of the distance threshold d1. FIG. 9 shows a value of around 30 meters can reach a balanced 80% in both coverage and accuracy.

In one embodiment, the training module 407 in connection with the machine learning system 125 selects respective factors such as transport modes, traffic patterns, road topology, driving behaviors, location sensor errors, digital map data errors, map mis-matching errors, etc., to determine optimal distance thresholds/widths/length for different scenarios in different regions (e.g., towns, city, suburbs, mountains, countries, etc.). In one embodiment, the training module 407 can train the machine learning system 125 to select or assign respective weights, correlations, relationships, etc. among the factors, to determine optimal distance thresholds/widths/length for different scenarios. In one instance, the training module 407 can continuously provide and/or update a machine learning model (e.g., a support vector machine (SVM), neural network, decision tree, etc.) of the machine learning system 125 during training using, for instance, supervised deep convolution networks or equivalents. In other words, the training module 407 trains the machine learning model using the respective weights of the factors to most efficiently select optimal distance thresholds/widths/length for different scenarios in different regions.

In another embodiment, the machine learning system 125 of the traffic platform 107 includes a neural network or other machine learning system to compare (e.g., iteratively) vehicle paths features and/or enhanced vehicle path features (e.g., using distance/width/length thresholds, offsets, etc.) to detect traffic incidents (e.g., road closures) on reported road segments. In one embodiment, the neural network of the machine learning system 125 is a traditional convolutional neural network which consists of multiple layers of collections of one or more neurons (which are configured to process a portion of an input data). In one embodiment, the machine learning system 125 also has connectivity or access over the communication network 109 to the probe data layer 121 and/or the geographic database 123 that can each store probe data, labeled or marked features (e.g., historically expected volumes and/or real-time actual observed volumes on road segments), etc.

In one embodiment, the training module 407 can improve the traffic incident detecting process using feedback loops based on, for example, user behavior and/or feedback data (e.g., from traffic incident specialists). In one embodiment, the training module 407 can improve a machine learning model for the traffic incident detecting process using user behavior and/or feedback data as training data. For example, the training module 407 can analyze correctly identified traffic incent data, missed traffic incident data, etc. to determine the performance of the machine learning model.

In one embodiment, the output module 409 can provide the detect closure data to the services platform 115 that provides, for example, mapping services, navigation services, traffic incident services, travel planning services, notification services, social networking services, content (e.g., audio, video, images, etc.) provisioning services, application services, storage services, contextual information determination services, location-based services, information-based services (e.g., weather, news, etc.), etc.

In another embodiment, the output module 409 can provide the detect closure data to for automatic closure verification (ACV) thereby improving ACV decision accuracy. By way of example, the ACV verifies a road closure on the road link based on the detected road closure.

Figure 10A:
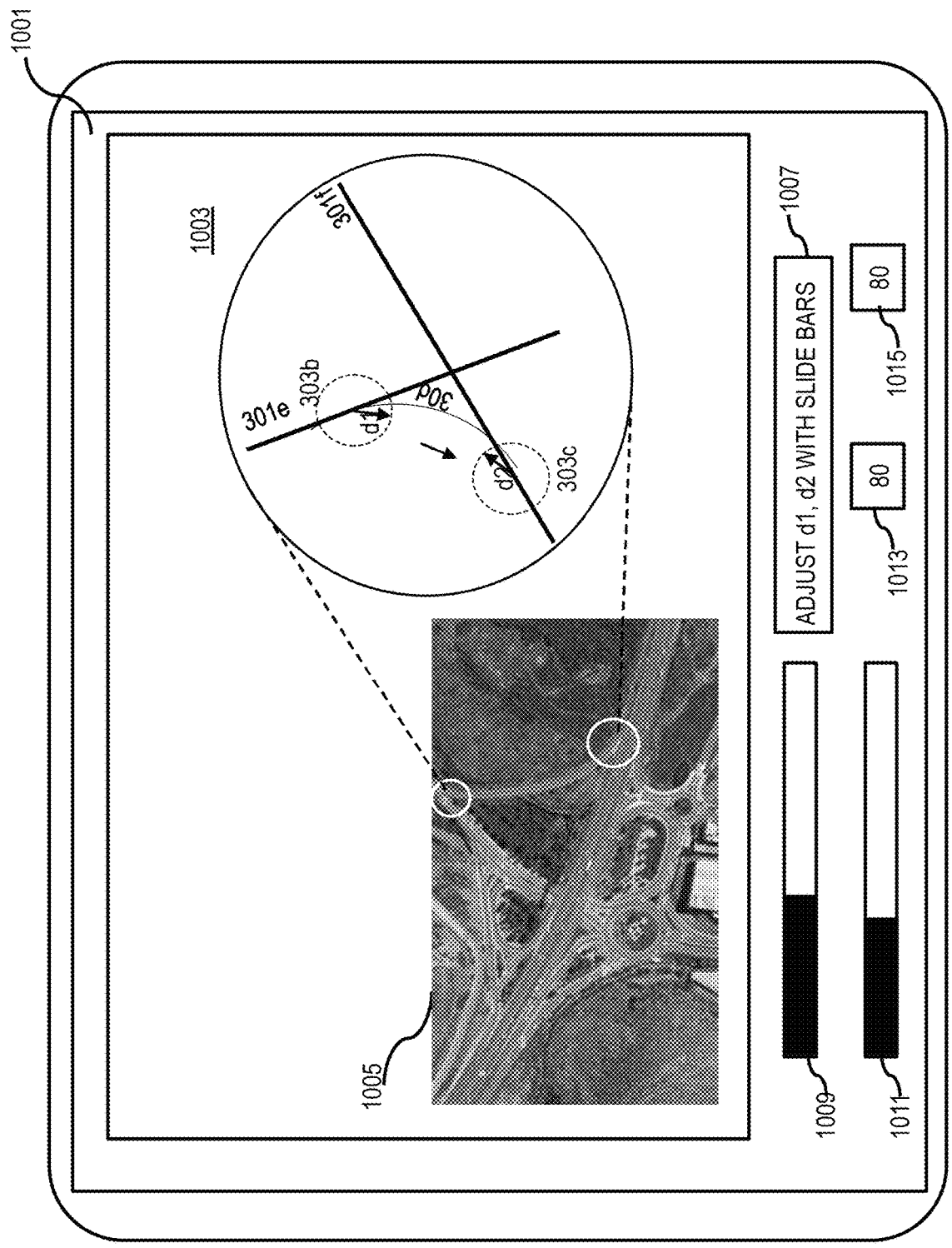
FIG. 10A is a diagram of an example user interface capable of adjusting a distance threshold, according to one embodiment.

FIG. 10A is a diagram of an example user interface 1001 capable of adjusting a distance threshold, according to one embodiment. The user interface 1001 shows an enlarged diagram 1003 of a ramp (e.g., FIG. 3B) within an image 1005 of an interchange. The user interface 1001 shows an instruction 1007: "Adjust d1, d2 with slide bars." When the user manipulates the slide bars 1009, 1011 to adjust the distance thresholds d1, d2, the system 100 can determine respective balanced 80% in both coverage and accuracy as 80% in a box 1013 and a box 1015.

Figure 10B:
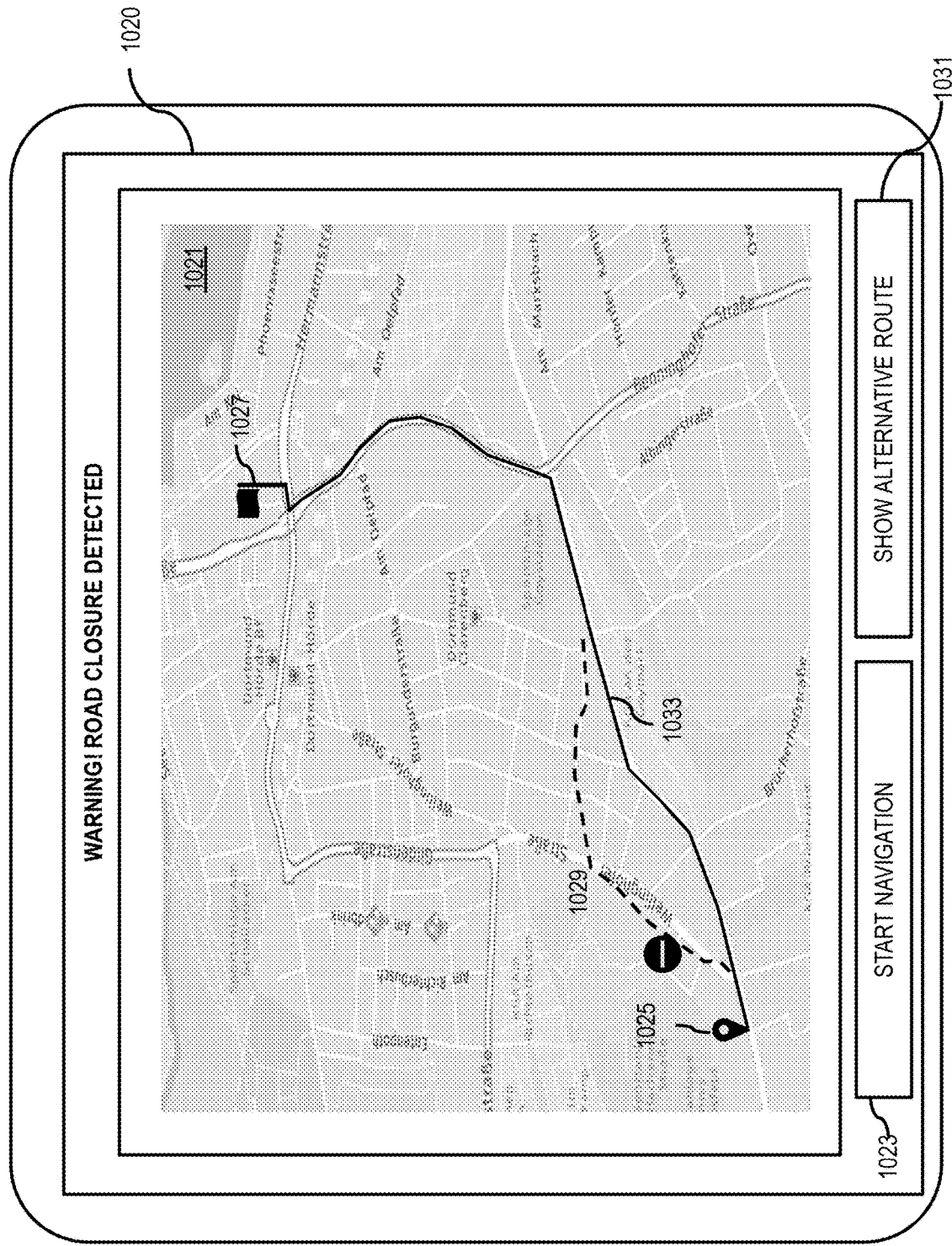
FIG. 10B is a diagram of an example user interface for navigating around a traffic incident on one of nearby paths, according to one embodiment.

FIG. 10B is a diagram of an example user interface for navigating around a traffic incident on one of nearby paths, according to one embodiment. In this example, a user interface (UI) 1020 (e.g., a navigation application 113) is generated for a UE 111 (e.g., a mobile device, an embedded navigation system, a client terminal, etc.) that includes a map 1021, an input 1023 of "Start Navigation" between an origin 1025 and a destination 1027. However, the system 100 detects a traffic closure on a usual route 1029 of the user, and shows an alert: "Warning! Road Closure Detected." In response to an input 1031 of "Show Alternative Route," the UI 1020 presents an alternative route 1033.

The above-discussed embodiments can be apply to nearby road links including motorways, walkways, bicycle paths, train tracks, airplane runways, etc. to detect a traffic incident (e.g., a traffic closure) thereon, regardless of location sensor errors digital map errors, and/or map mis-matching errors. The above-discussed embodiments make no change on the existing link closure reporting implementation.

Returning to FIG. 1, in one embodiment, the traffic platform 107 performs the process for detecting a traffic incident on one of nearby paths as discussed with respect to the various embodiments described herein. For example, the traffic platform 107 can generate vehicle path related features for machine learning solutions (e.g., ACV).

In one embodiment, the traffic platform 107 has connectivity over the communications network 109 to the services platform 115 (e.g., an OEM platform) that provides the services 117*a*-117*n* (also collectively referred to herein as services 117) (e.g., probe and/or sensor data collection services). By way of example, the services 117 may also be other third-party services and include mapping services, navigation services, traffic incident services, travel planning services, notification services, social networking services, content (e.g., audio, video, images, etc.) provisioning services, application services, storage services, contextual information determination services, location-based services, information-based services (e.g., weather, news, etc.), etc. In one embodiment, the services platform 115 uses the output (e.g. whether a road segment is closed or not) of the traffic platform 107 to provide services such as navigation, mapping, other location-based services, etc.

In one embodiment, the traffic platform 107 may be a platform with multiple interconnected components. The traffic platform 107 may include multiple servers, intelligent networking devices, computing devices, components, and corresponding software for providing parametric representations of lane lines. In addition, it is noted that the traffic platform 107 may be a separate entity of the system 100, a part of the services platform 115, a part of the one or more services 117, or included within a vehicle 103 (e.g., an embedded navigation system).

In one embodiment, content providers 119*a-m* may provide content or data (e.g., including road closure reports, probe data, expected vehicle volume data, etc.) to the traffic platform 107, the UEs 111, the applications 113, the services platform 115, the services 117, the probe data layer 121, the geographic database 123, and the vehicles 103. The content provided may be any type of content, such as map content, textual content, audio content, video content, image content, etc. In one embodiment, the content providers 119 may provide content regarding the expected frequency of vehicles 103 on the digital map or link as well as content that may aid in localizing a vehicle path or trajectory on a digital map or link (e.g., to assist with determining actual vehicle volumes on a road network). In one embodiment, the content providers 119 may also store content associated with the traffic platform 107, the services platform 115, the services 117, the probe data layer 121, the geographic database 123, and/or the vehicles 103. In another embodiment, the content providers 119 may manage access to a central repository of data, and offer a consistent, standard interface to data, such as a repository of the probe data layer 121 and/or the geographic database 123.

By way of example, the UEs 111 are any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that a UE 111 can support any type of interface to the user (such as "wearable" circuitry, etc.). In one embodiment, a UE 111 may be associated with a vehicle 103 (e.g., a mobile device) or be a component part of the vehicle 103 (e.g., an embedded navigation system). In one embodiment, the UEs 111 may include the traffic platform 107 to detect a traffic incident on one of nearby paths.

In one embodiment, as mentioned above, the vehicles 103, for instance, are part of a probe-based system for collecting probe data for detecting actual and expected vehicle volumes on a road network and/or measuring traffic conditions in a road network (e.g., free flow traffic versus a road closure). In one embodiment, each vehicle 103 is configured to report probe data as probe points, which are individual data records collected at a point in time that records telemetry data for that point in time. In one embodiment, the probe ID can be permanent or valid for a certain period of time. In one embodiment, the probe ID is cycled, particularly for consumer-sourced data, to protect the privacy of the source.

In one embodiment, a probe point can include attributes such as: (1) probe ID, (2) longitude, (3) latitude, (4) heading, (5) speed, and (6) time. The list of attributes is provided by way of illustration and not limitation. Accordingly, it is contemplated that any combination of these attributes or other attributes may be recorded as a probe point. For example, attributes such as altitude (e.g., for flight capable vehicles or for tracking non-flight vehicles in the altitude domain), tilt, steering angle, wiper activation, etc. can be included and reported for a probe point. In one embodiment, the vehicles 103 may include vehicle sensors 105 for reporting measuring and/or reporting attributes. The attributes can also be any attribute normally collected by an on-board diagnostic (OBD) system of the vehicle 103, and available through an interface to the OBD system (e.g., OBD II interface or other similar interface).

The probe points can be reported from the vehicles 103 in real-time, in batches, continuously, or at any other frequency requested by the system 100 over, for instance, the communication network 109 for processing by the traffic platform 107. The probe points also can be map matched to specific road links stored in the geographic database 123. In one embodiment, the system 100 (e.g., via the traffic platform 107) generates vehicle paths or trajectories from the observed and expected frequency of probe points for an individual probe as discussed with respect to the various embodiments described herein so that the probe traces represent a travel trajectory or vehicle path of the probe through the road network.

In one embodiment, as previously stated, the vehicles 103 are configured with various sensors (e.g., vehicle sensors 105) for generating or collecting probe data, sensor data, related geographic/map data, etc. In one embodiment, the sensed data represents sensor data associated with a geographic location or coordinates at which the sensor data was collected (e.g., a latitude and longitude pair). In one embodiment, the probe data (e.g., stored in the probe data layer 121) includes location probes collected by one or more vehicle sensors 105. By way of example, the vehicle sensors 105 may include a RADAR system, a LiDAR system, global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data, an audio recorder for gathering audio data, velocity sensors mounted on a steering wheel of the vehicles 103, switch sensors for determining whether one or more vehicle switches are engaged, and the like. Though depicted as automobiles, it is contemplated the vehicles 103 can be any type of vehicle manned or unmanned (e.g., cars, trucks, buses, vans, motorcycles, scooters, drones, etc.) that travels through road segments of a road network.

Other examples of sensors 105 of a vehicle 103 may include light sensors, orientation sensors augmented with height sensors and acceleration sensor (e.g., an accelerometer can measure acceleration and can be used to determine orientation of the vehicle), tilt sensors to detect the degree of incline or decline of a vehicle 103 along a path of travel, moisture sensors, pressure sensors, etc. In a further example embodiment, vehicle sensors 105 about the perimeter of a vehicle 103 may detect the relative distance of the vehicle 103 from a physical divider, a lane line of a link or roadway, the presence of other vehicles, pedestrians, traffic lights, potholes and any other objects, or a combination thereof. In one scenario, the vehicle sensors 105 may detect weather data, traffic information, or a combination thereof. In one embodiment, a vehicle 103 may include GPS or other satellite-based receivers to obtain geographic coordinates from satellites 127 for determining current location and time. Further, the location can be determined by visual odometry, triangulation systems such as A-GPS, Cell of Origin, or other location extrapolation technologies.

In one embodiment, the UEs 111 may also be configured with various sensors (not shown for illustrative convenience) for acquiring and/or generating probe data and/or sensor data associated with a vehicle 103, a driver, a passenger, other vehicles, conditions regarding the driving environment or roadway, etc. For example, such sensors may be used as GPS receivers for interacting with the one or more satellites 127 to determine and track the current speed, position, and location of a vehicle 103 travelling along a link or road segment. In addition, the sensors may gather tilt data (e.g., a degree of incline or decline of the vehicle during travel), motion data, light data, sound data, image data, weather data, temporal data and other data associated with the vehicles 103 and/or UEs 111. Still further, the sensors may detect local or transient network and/or wireless signals, such as those transmitted by nearby devices during navigation of a vehicle along a roadway (Li-Fi, near field communication (NFC)) etc.

It is noted therefore that the above described data may be transmitted via the communication network 109 as probe data (e.g., GPS probe data) according to any known wireless communication protocols. For example, each UE 111, application 113, user, and/or vehicle 103 may be assigned a unique probe identifier (probe ID) for use in reporting or transmitting the probe data collected by the vehicles 103 and/or UEs 111. In one embodiment, each vehicle 103 and/or UE 111 is configured to report probe data as probe points, which are individual data records collected at a point in time that records telemetry data.

In one embodiment, the traffic platform 107 retrieves aggregated probe points gathered and/or generated by the vehicle sensors 105 and/or the UEs 111 resulting from the travel of the UEs 111 and/or vehicles 103 on a road segment of a road network. In one instance, the probe data layer 121 stores a plurality of probe points and/or trajectories generated by different vehicle sensors 105, UEs 111, applications 113, vehicles 103, etc. over a period while traveling in a large monitored area (e.g., a stretch of roadway where a closure incident is reported). A time sequence of probe points specifies a trajectory—i.e., a path traversed by a UE 111, application 113, vehicle 103, etc. over the period. In one instance, as the time between data points increases, so does the distance and the possible routes/paths between those two points.

In one embodiment, the communication network 109 of the system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the vehicles 103, vehicle sensors 105, traffic platform 107, UEs 111, applications 113, services platform 115, services 117, content providers 119, and/or satellites 127 communicate with each other and other components of the system 100 using well known, new or still developing protocols. In this context, a protocol includes a set of rules defining how the network nodes within the communication network 109 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 11:
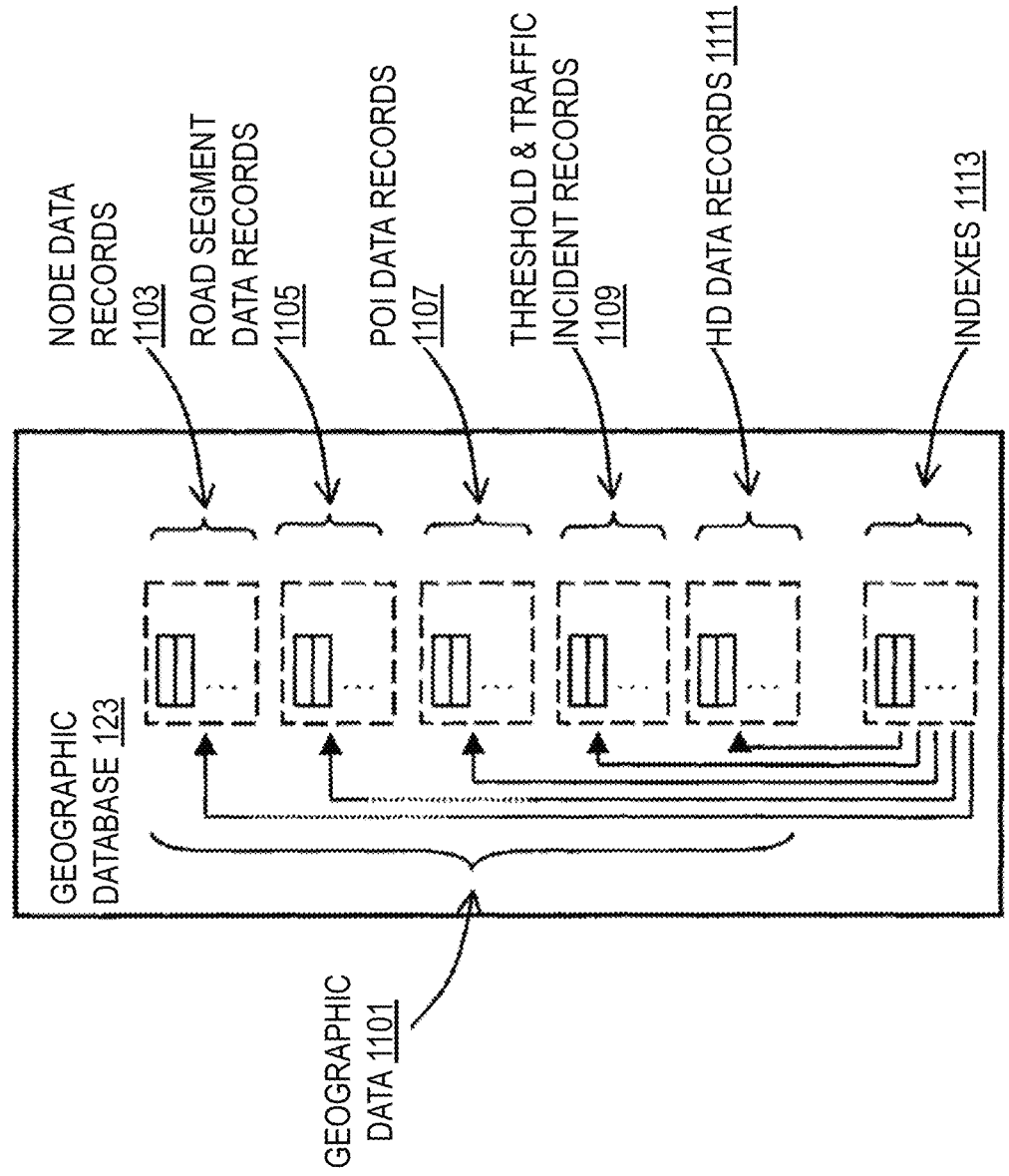
FIG. 11 is a diagram of a geographic database, according to one embodiment.

FIG. 11 is a diagram of a geographic database (such as the database 123), according to one embodiment. In one embodiment, the geographic database 123 includes geographic data 1101 used for (or configured to be compiled to be used for) mapping and/or navigation-related services, such as for video odometry based on the parametric representation of lanes include, e.g., encoding and/or decoding parametric representations into lane lines. In one embodiment, the geographic database 123 include high resolution or high definition (HD) mapping data that provide centimeter-level or better accuracy of map features. For example, the geographic database 123 can be based on Light Detection and Ranging (LiDAR) or equivalent technology to collect billions of 3D points and model road surfaces and other map features down to the number lanes and their widths. In one embodiment, the HD mapping data (e.g., HD data records 1111) capture and store details such as the slope and curvature of the road, lane markings, roadside objects such as signposts, including what the signage denotes. By way of example, the HD mapping data enable highly automated vehicles to precisely localize themselves on the road.

In one embodiment, geographic features (e.g., two-dimensional, or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 123.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 123 follows certain conventions. For example, links do not cross themselves and do not cross each other except at a node. Also, there are no duplicated shape points, nodes, or links. Two links that connect each other have a common node. In the geographic database 123, overlapping geographic features are represented by overlapping polygons. When polygons overlap, the boundary of one polygon crosses the boundary of the other polygon. In the geographic database 123, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 123 includes node data records 1103, road segment or link data records 1105, POI data records 1107, threshold and traffic incident data records 1109, HD mapping data records 1111, and indexes 1113, for example. More, fewer, or different data records can be provided. In one embodiment, additional data records (not shown) can include cartographic ("cartel") data records, routing data, and maneuver data. In one embodiment, the indexes 1113 may improve the speed of data retrieval operations in the geographic database 123. In one embodiment, the indexes 1113 may be used to quickly locate data without having to search every row in the geographic database 123 every time it is accessed. For example, in one embodiment, the indexes 1113 can be a spatial index of the polygon points associated with stored feature polygons.

In exemplary embodiments, the road segment data records 1105 are links or segments representing roads, streets, or paths, as can be used in the calculated route or recorded route information for determination of one or more personalized routes. The node data records 1103 are end points corresponding to the respective links or segments of the road segment data records 1105. The road link data records 1105 and the node data records 1103 represent a road network, such as used by vehicles, cars, and/or other entities. Alternatively, the geographic database 123 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 123 can include data about the POIs and their respective locations in the POI data records 1107. The geographic database 123 can also include data about places, such as cities, towns, or other communities, and other geographic features, such as bodies of water, mountain ranges, etc. Such place or feature data can be part of the POI data records 1107 or can be associated with POIs or POI data records 1107 (such as a data point used for displaying or representing a position of a city).

In one embodiment, the geographic database 123 can also include the threshold and traffic incident data records 1109 for storing threshold data, traffic incident data, training data, prediction models, annotated observations, computed featured distributions, sampling probabilities, and/or any other data generated or used by the system 100 according to the various embodiments described herein. By way of example, the threshold and traffic incident data records 1109 can be associated with one or more of the node records 1103, road segment records 1105, and/or POI data records 1107 to support localization or visual odometry based on the features stored therein and the corresponding estimated quality of the features. In this way, the threshold and traffic incident data records 1109 can also be associated with or used to classify the characteristics or metadata of the corresponding records 1103, 1105, and/or 1107.

In one embodiment, as discussed above, the HD mapping data records 1111 model road surfaces and other map features to centimeter-level or better accuracy. The HD mapping data records 1111 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the HD mapping data records 1111 are divided into spatial partitions of varying sizes to provide HD mapping data to vehicles 103 and other end user devices with near real-time speed without overloading the available resources of the vehicles 103 and/or devices (e.g., computational, memory, bandwidth, etc. resources).

In one embodiment, the HD mapping data records 1111 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 1111.

In one embodiment, the HD mapping data records 1111 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 123 can be maintained by the content provider 119 in association with the services platform 115 (e.g., a map developer). The map developer can collect geographic data to generate and enhance the geographic database 123. There can be different ways used by the map developer to collect data. These ways can include obtaining data from other sources, such as municipalities or respective geographic authorities. In addition, the map developer can employ field personnel to travel by vehicle (e.g., vehicles 103 and/or UE 111) along roads throughout the geographic region to observe features and/or record information about them, for example. Also, remote sensing, such as aerial or satellite photography, can be used.

The geographic database 123 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 103 or a user terminal 111, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for detecting a traffic incident (e.g., a road closure) on one of connecting or nearby paths may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 12:
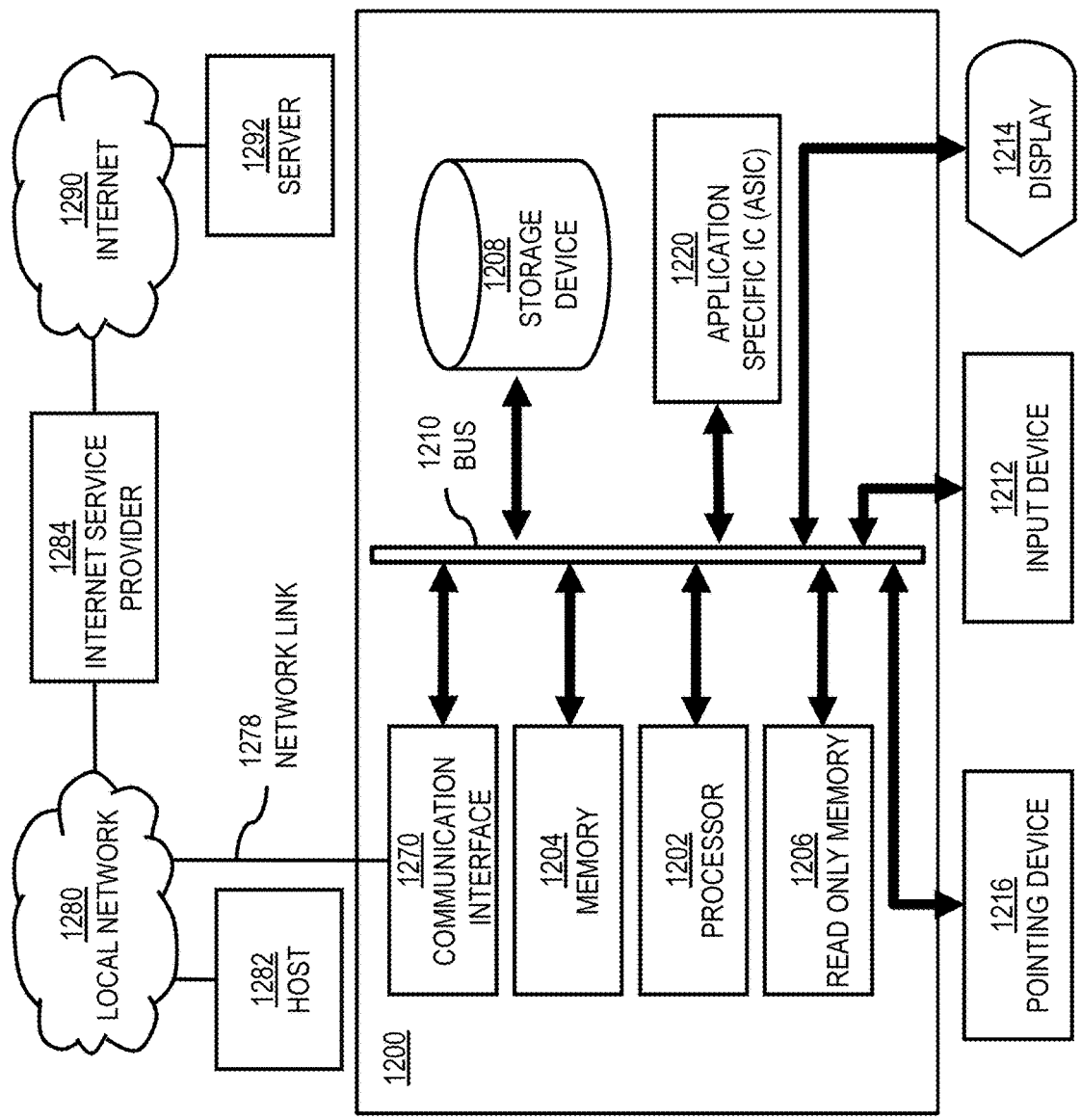
FIG. 12 is a diagram of hardware that can be used to implement an embodiment.

FIG. 12 illustrates a computer system 1200 upon which an embodiment of the invention may be implemented. Computer system 1200 is programmed (e.g., via computer program code or instructions) to detect a traffic incident (e.g., a road closure) on one of connecting or nearby paths as described herein and includes a communication mechanism such as a bus 1210 for passing information between other internal and external components of the computer system 1200. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1210 includes one or more parallel conductors of information so that information is transferred quickly among devices coupled to the bus 1210. One or more processors 1202 for processing information are coupled with the bus 1210.

A processor 1202 performs a set of operations on information as specified by computer program code related to detecting a traffic incident (e.g., a road closure) on one of connecting or nearby paths. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1210 and placing information on the bus 1210. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1202, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1200 also includes a memory 1204 coupled to bus 1210. The memory 1204, such as a random access memory (RANI) or other dynamic storage device, stores information including processor instructions for detecting a traffic incident (e.g., a road closure) on one of connecting or nearby paths. Dynamic memory allows information stored therein to be changed by the computer system 1200. RANI allows a unit of information stored at a location called a memory address to be stored and retrieved independently of information at neighboring addresses. The memory 1204 is also used by the processor 1202 to store temporary values during execution of processor instructions. The computer system 1200 also includes a read only memory (ROM) 1206 or other static storage device coupled to the bus 1210 for storing static information, including instructions, that is not changed by the computer system 1200. Some memory is composed of volatile storage that loses the information stored thereon when power is lost. Also coupled to bus 1210 is a non-volatile (persistent) storage device 1208, such as a magnetic disk, optical disk, or flash card, for storing information, including instructions, that persists even when the computer system 1200 is turned off or otherwise loses power.

Information, including instructions for detecting a traffic incident (e.g., a road closure) on one of connecting or nearby paths, is provided to the bus 1210 for use by the processor from an external input device 1212, such as a keyboard containing alphanumeric keys operated by a human user, or a sensor. A sensor detects conditions in its vicinity and transforms those detections into physical expression compatible with the measurable phenomenon used to represent information in computer system 1200. Other external devices coupled to bus 1210, used primarily for interacting with humans, include a display device 1214, such as a cathode ray tube (CRT) or a liquid crystal display (LCD), or plasma screen or printer for presenting text or images, and a pointing device 1216, such as a mouse or a trackball or cursor direction keys, or motion sensor, for controlling a position of a small cursor image presented on the display 1214 and issuing commands associated with graphical elements presented on the display 1214. In some embodiments, for example, in embodiments in which the computer system 1200 performs all functions automatically without human input, one or more of external input device 1212, display device 1214 and pointing device 1216 is omitted.

In the illustrated embodiment, special purpose hardware, such as an application specific integrated circuit (ASIC) 1220, is coupled to bus 1210. The special purpose hardware is configured to perform operations not performed by processor 1202 quickly enough for special purposes. Examples of application specific ICs include graphics accelerator cards for generating images for display 1214, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1200 also includes one or more instances of a communications interface 1270 coupled to bus 1210. Communication interface 1270 provides a one-way or two-way communication coupling to a variety of external devices that operate with their own processors, such as printers, scanners, and external disks. In general the coupling is with a network link 1278 that is connected to a local network 1280 to which a variety of external devices with their own processors are connected. For example, communication interface 1270 may be a parallel port or a serial port or a universal serial bus (USB) port on a personal computer. In some embodiments, communications interface 1270 is an integrated services digital network (ISDN) card or a digital subscriber line (DSL) card or a telephone modem that provides an information communication connection to a corresponding type of telephone line. In some embodiments, a communication interface 1270 is a cable modem that converts signals on bus 1210 into signals for a communication connection over a coaxial cable or into optical signals for a communication connection over a fiber optic cable. As another example, communications interface 1270 may be a local area network (LAN) card to provide a data communication connection to a compatible LAN, such as Ethernet. Wireless links may also be implemented. For wireless links, the communications interface 1270 sends or receives or both sends and receives electrical, acoustic, or electromagnetic signals, including infrared and optical signals, that carry information streams, such as digital data. For example, in wireless handheld devices, such as mobile telephones like cell phones, the communications interface 1270 includes a radio band electromagnetic transmitter and receiver called a radio transceiver. In certain embodiments, the communications interface 1270 enables connection to the communication network 109 for detecting a traffic incident (e.g., a road closure) on one of connecting or nearby paths to the vehicle 103 and/or the UE 111.

The term computer-readable medium is used herein to refer to any medium that participates in providing information to processor 1202, including instructions for execution. Such a medium may take many forms, including, but not limited to, non-volatile media, volatile media, and transmission media. Non-volatile media include, for example, optical or magnetic disks, such as storage device 1208. Volatile media include, for example, dynamic memory 1204. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization, or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 1278 typically provides information communication using transmission media through one or more networks to other devices that use or process the information. For example, network link 1278 may provide a connection through local network 1280 to a host computer 1282 or to equipment 1284 operated by an Internet Service Provider (ISP). ISP equipment 1284 in turn provides data communication services through the public, world-wide packet-switching communication network of networks now commonly referred to as the Internet 1290.

A computer called a server host 1292 connected to the Internet hosts a process that provides a service in response to information received over the Internet. For example, server host 1292 hosts a process that provides information representing video data for presentation at display 1214. It is contemplated that the components of system can be deployed in various configurations within other computer systems, e.g., host 1282 and server 1292.

FIG. 13 illustrates a chip set 1300 upon which an embodiment of the invention may be implemented. Chip set 1300 is programmed to detect a traffic incident (e.g., a road closure) on one of connecting or nearby paths as described herein and includes, for instance, the processor and memory components described with respect to FIG. 12 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1300 includes a communication mechanism such as a bus 1301 for passing information among the components of the chip set 1300. A processor 1303 has connectivity to the bus 1301 to execute instructions and process information stored in, for example, a memory 1305. The processor 1303 may include one or more processing cores with each core configured to perform independently. A multi-core processor enables multiprocessing within a single physical package. Examples of a multi-core processor include two, four, eight, or greater numbers of processing cores. Alternatively or in addition, the processor 1303 may include one or more microprocessors configured in tandem via the bus 1301 to enable independent execution of instructions, pipelining, and multithreading. The processor 1303 may also be accompanied with one or more specialized components to perform certain processing functions and tasks such as one or more digital signal processors (DSP) 1307, or one or more application-specific integrated circuits (ASIC) 1309. A DSP 1307 typically is configured to process real-world signals (e.g., sound) in real time independently of the processor 1303. Similarly, an ASIC 1309 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1303 and accompanying components have connectivity to the memory 1305 via the bus 1301. The memory 1305 includes both dynamic memory (e.g., RAM, magnetic disk, writable optical disk, etc.) and static memory (e.g., ROM, CD-ROM, etc.) for storing executable instructions that when executed perform the inventive steps described herein to detect a traffic incident (e.g., a road closure) on one of connecting or nearby paths. The memory 1305 also stores the data associated with or generated by the execution of the inventive steps.

Figure 14:
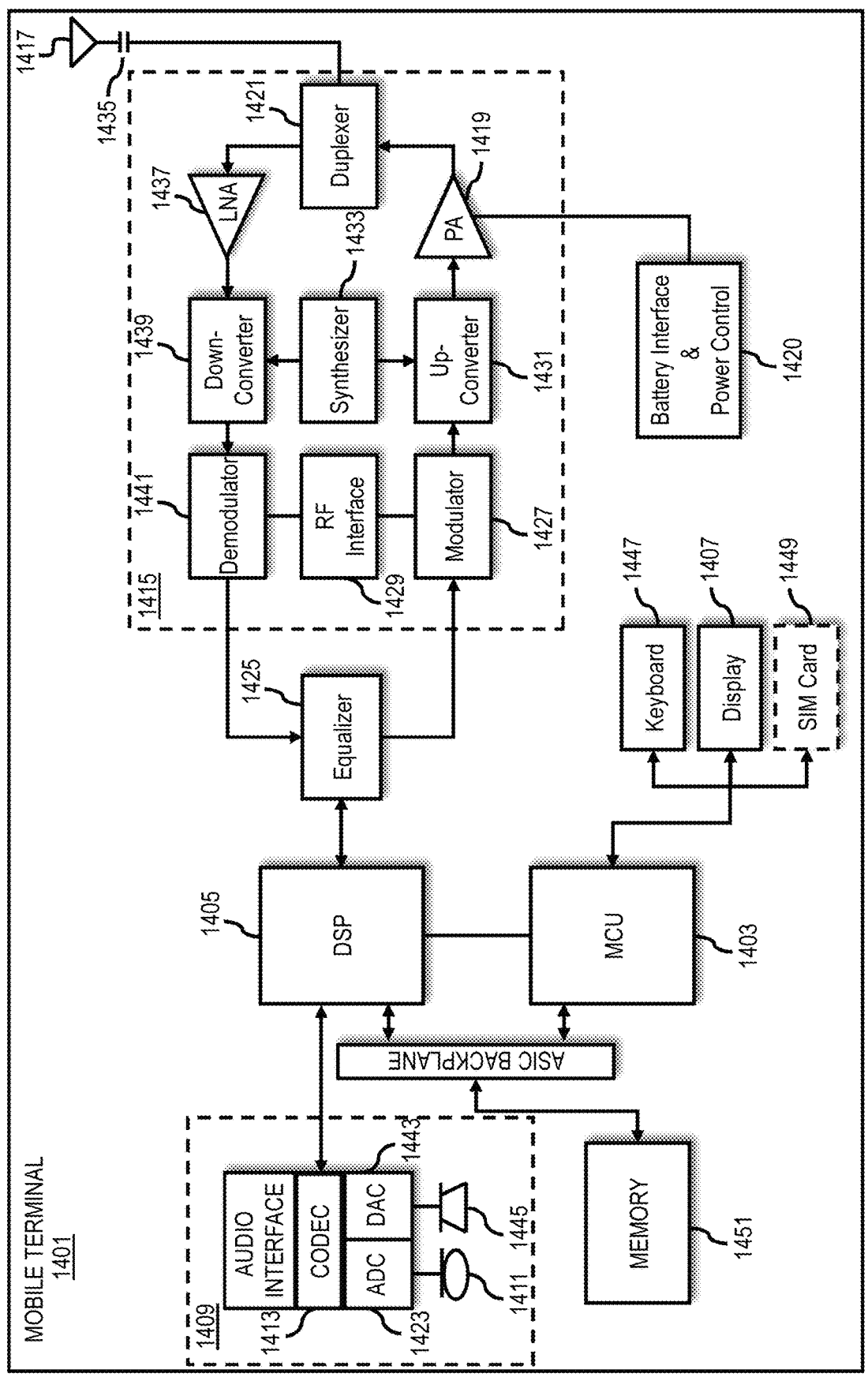
FIG. 14 is a diagram of a mobile terminal (e.g., handset or vehicle or part thereof) that can be used to implement an embodiment.

FIG. 14 is a diagram of exemplary components of a mobile terminal 1401 (e.g., handset or vehicle or part thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1403, a Digital Signal Processor (DSP) 1405, and a receiver/transmitter unit including a microphone gain control unit and a speaker gain control unit. A main display unit 1407 provides a display to the user in support of various applications and mobile station functions that offer automatic contact matching. An audio function circuitry 1409 includes a microphone 1411 and microphone amplifier that amplifies the speech signal output from the microphone 1411. The amplified speech signal output from the microphone 1411 is fed to a coder/decoder (CODEC) 1413.

A radio section 1415 amplifies power and converts frequency in order to communicate with a base station, which is included in a mobile communication system, via antenna 1417. The power amplifier (PA) 1419 and the transmitter/modulation circuitry are operationally responsive to the MCU 1403, with an output from the PA 1419 coupled to the duplexer 1421 or circulator or antenna switch, as known in the art. The PA 1419 also couples to a battery interface and power control unit 1420.

In use, a user of mobile station 1401 speaks into the microphone 1411 and his or her voice along with any detected background noise is converted into an analog voltage. The analog voltage is then converted into a digital signal through the Analog to Digital Converter (ADC) 1423. The control unit 1403 routes the digital signal into the DSP 1405 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1425 for compensation of any frequency-dependent impairments that occur during transmission though the air such as phase and amplitude distortion. After equalizing the bit stream, the modulator 1427 combines the signal with a RF signal generated in the RF interface 1429. The modulator 1427 generates a sine wave by way of frequency or phase modulation. In order to prepare the signal for transmission, an up-converter 1431 combines the sine wave output from the modulator 1427 with another sine wave generated by a synthesizer 1433 to achieve the desired frequency of transmission. The signal is then sent through a PA 1419 to increase the signal to an appropriate power level. In practical systems, the PA 1419 acts as a variable gain amplifier whose gain is controlled by the DSP 1405 from information received from a network base station. The signal is then filtered within the duplexer 1421 and optionally sent to an antenna coupler 1435 to match impedances to provide maximum power transfer. Finally, the signal is transmitted via antenna 1417 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1401 are received via antenna 1417 and immediately amplified by a low noise amplifier (LNA) 1437. A down-converter 1439 lowers the carrier frequency while the demodulator 1441 strips away the RF leaving only a digital bit stream. The signal then goes through the equalizer 1425 and is processed by the DSP 1405. A Digital to Analog Converter (DAC) 1443 converts the signal and the resulting output is transmitted to the user through the speaker 1445, all under control of a Main Control Unit (MCU) 1403—which can be implemented as a Central Processing Unit (CPU) (not shown).

The MCU 1403 receives various signals including input signals from the keyboard 1447. The keyboard 1447 and/or the MCU 1403 in combination with other user input components (e.g., the microphone 1411) comprise a user interface circuitry for managing user input. The MCU 1403 runs a user interface software to facilitate user control of at least some functions of the mobile station 1401 to detect a traffic incident (e.g., a road closure) on one of connecting or nearby paths. The MCU 1403 also delivers a display command and a switch command to the display 1407 and to the speech output switching controller, respectively. Further, the MCU 1403 exchanges information with the DSP 1405 and can access an optionally incorporated SIM card 1449 and a memory 1451. In addition, the MCU 1403 executes various control functions required of the station. The DSP 1405 may, depending upon the implementation, perform any of a variety of conventional digital processing functions on the voice signals. Additionally, DSP 1405 determines the background noise level of the local environment from the signals detected by microphone 1411 and sets the gain of microphone 1411 to a level selected to compensate for the natural tendency of the user of the mobile station 1401.

The CODEC 1413 includes the ADC 1423 and DAC 1443. The memory 1451 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1451 may be, but not limited to, a single memory, CD, DVD, ROM, RAM, EEPROM, optical storage, or any other non-volatile or non-transitory storage medium capable of storing digital data.

An optionally incorporated SIM card 1449 carries, for instance, important information, such as the cellular phone number, the carrier supplying service, subscription details, and security information. The SIM card 1449 serves primarily to identify the mobile station 1401 on a radio network. The card 1449 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining, by one or more processors, sensor data collected from one or more sensors of one or more devices traveling on either road link of at least two road links connected at an intersection point;
   aggregating, by the one or more processors, the sensor data to said either road link of the at least two road links;
   filtering away, by the one or more processors, the sensor data based on a distance threshold from the intersection point;
   determining, by the one or more processors, a traffic closure on said either road link based on determining that a number of data points of the filtered sensor data beyond the distance threshold from the intersection point is below a threshold number or equal to zero; and
   providing, by the one or more processors, a traffic report indicating the traffic closure to one or more vehicles.

2. The method of claim 1, further comprising:
   causing at least one of the one or more vehicles to navigate based on the traffic closure,
   wherein the filtered sensor data excludes one or more sensor data points mismatched to said either road link.

3. The method of claim 1, further comprising:
   processing map data to determine that the at least two road links include a main link and a frontage link, wherein the traffic report indicates the traffic closure on the main link or the frontage link.

4. The method of claim 3, wherein the frontage link is an access road or a service road.

5. The method of claim 1, further comprising:
   determining whether a maximum offset of the filtered sensor data relative to a starting point of said either road link exists, the maximum offset being larger than the distance threshold,
   wherein the road closure is determined based on the nonexistence of the maximum offset.

6. The method of claim 1, wherein the filtering further comprises filtering the sensor data based on another distance threshold from an endpoint of said either road link.

7. The method of claim 6, wherein the traffic closure is determined based on the sensor data that is upstream from the distance threshold and downstream from the another distance threshold.

8. The method of claim 1, wherein the aggregating of the sensor data is based on a map-matcher.

9. The method of claim 1, further comprising:
   processing map data to determine the intersection point.

10. The method of claim 1, further comprising:
    processing map data to determine that a first link of the at least two road links is a ramp link based on determining that the first link has a fewer number of lanes than a second link of the at least two links.

11. The method of claim 1, further comprising:
    determining that said either road link is a ramp link based on a speed attribute, a heading attribute, or a combination thereof of said either road link queried from map data.

12. The method of claim 1, wherein the sensor data includes probe data.

13. An apparatus comprising:
    at least one processor; and
    at least one memory including computer program code for one or more programs,
    the at least one memory and the computer program code configured to, with the at least one processor, cause the apparatus to perform at least the following,
       determine sensor data collected from one or more sensors of one or more devices traveling on a road link;
       aggregate the sensor data to the road link;
       filter away the sensor data corresponding to at least one section of the road link that is located within a distance threshold from at least one other road link, wherein the at least one section of the road link is a closest section thereof to the at least one other road link; and
       determine a traffic closure on the road link based on determining that a number of data points of the filtered sensor data beyond the distance threshold is below a threshold number or equal to zero; and
       provide a traffic report indicating the traffic closure to one or more vehicles.

14. The apparatus of claim 13, wherein the apparatus is further caused to:
    cause at least one of the one or more vehicles to navigate based on the traffic closure, wherein the filtered sensor data excludes one or more sensor data points mismatched to said either road link.

15. The apparatus of claim 13, wherein the apparatus is further caused to:
process map data to determine that the road link is a main link and the at least one other road link includes a frontage link or a ramp link, wherein the traffic report indicates the traffic closure on the main link, the frontage link, or the ramp link.

16. The apparatus of claim 15, wherein the frontage link is an access road or a service road.

17. A non-transitory computer-readable storage medium carrying one or more sequences of one or more instructions which, when executed by one or more processors, cause an apparatus to perform:
determining sensor data collected from one or more sensors of one or more devices traveling within a threshold proximity of a point of interest;
filtering away the sensor data based on a distance threshold from a boundary location of the point of interest; and
determining a closure of the point of interest based on determining that a number of data points of the filtered sensor data beyond the distance threshold from the boundary location is below a threshold number or equal to zero; and
providing a report indicating the closure of the point of interest to one or more other devices.

18. The non-transitory computer-readable storage medium of claim 17, wherein the boundary location includes an entrance of the point of interest.

19. The non-transitory computer-readable storage medium of claim 17, wherein the filtered sensor data excludes one or more sensor data points within the point of interest yet mismatched as outside of the point of interest, one or more sensor data points outside of the point of interest yet mismatched as within the point of interest, or a combination thereof.

20. The non-transitory computer-readable storage medium of claim 17, wherein the distance threshold is based on a positioning accuracy of the one or more sensors.

* * * * *